INVENTOR
JOHN V. FREDD
NORMAN F. BROWN

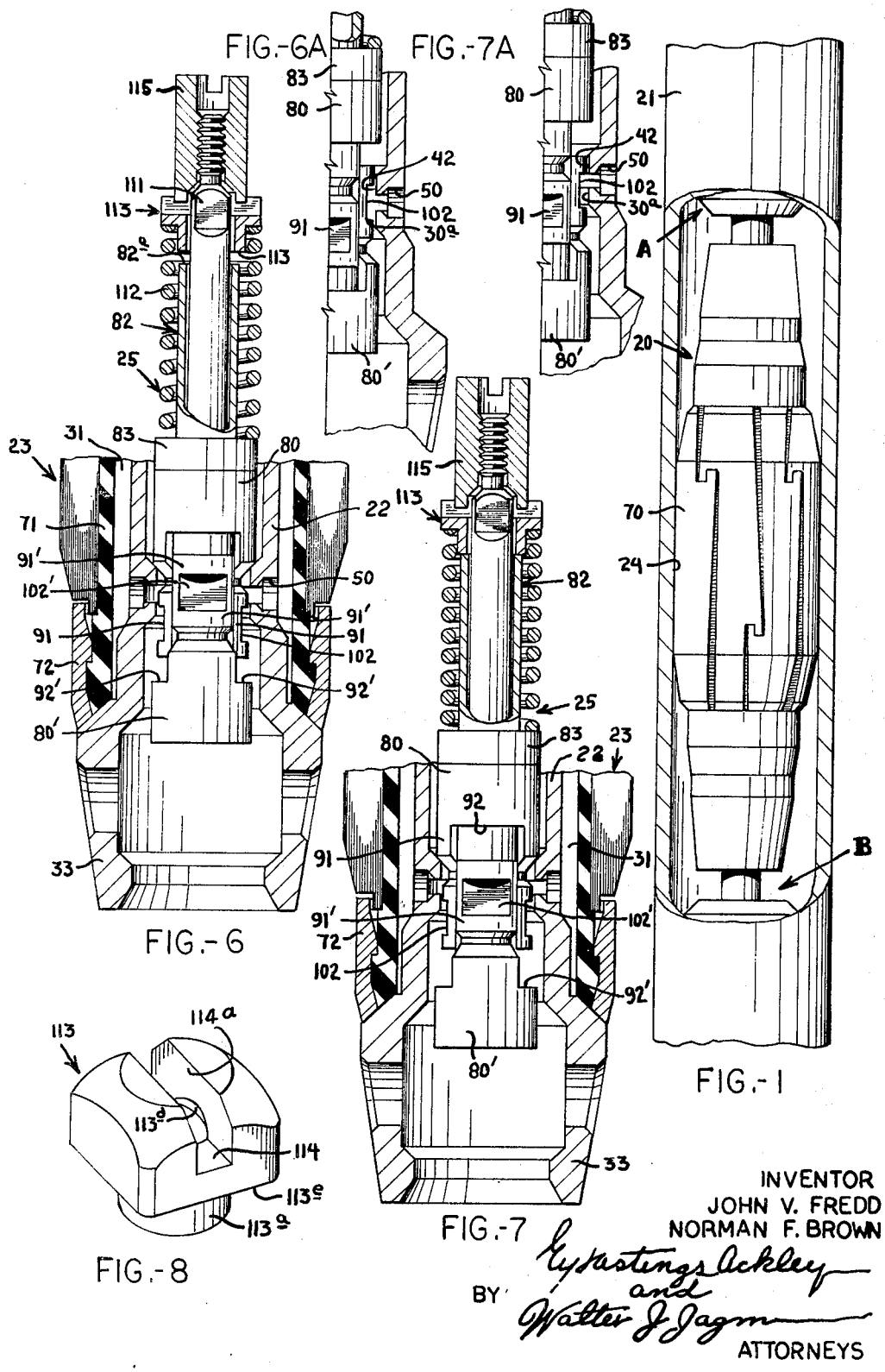

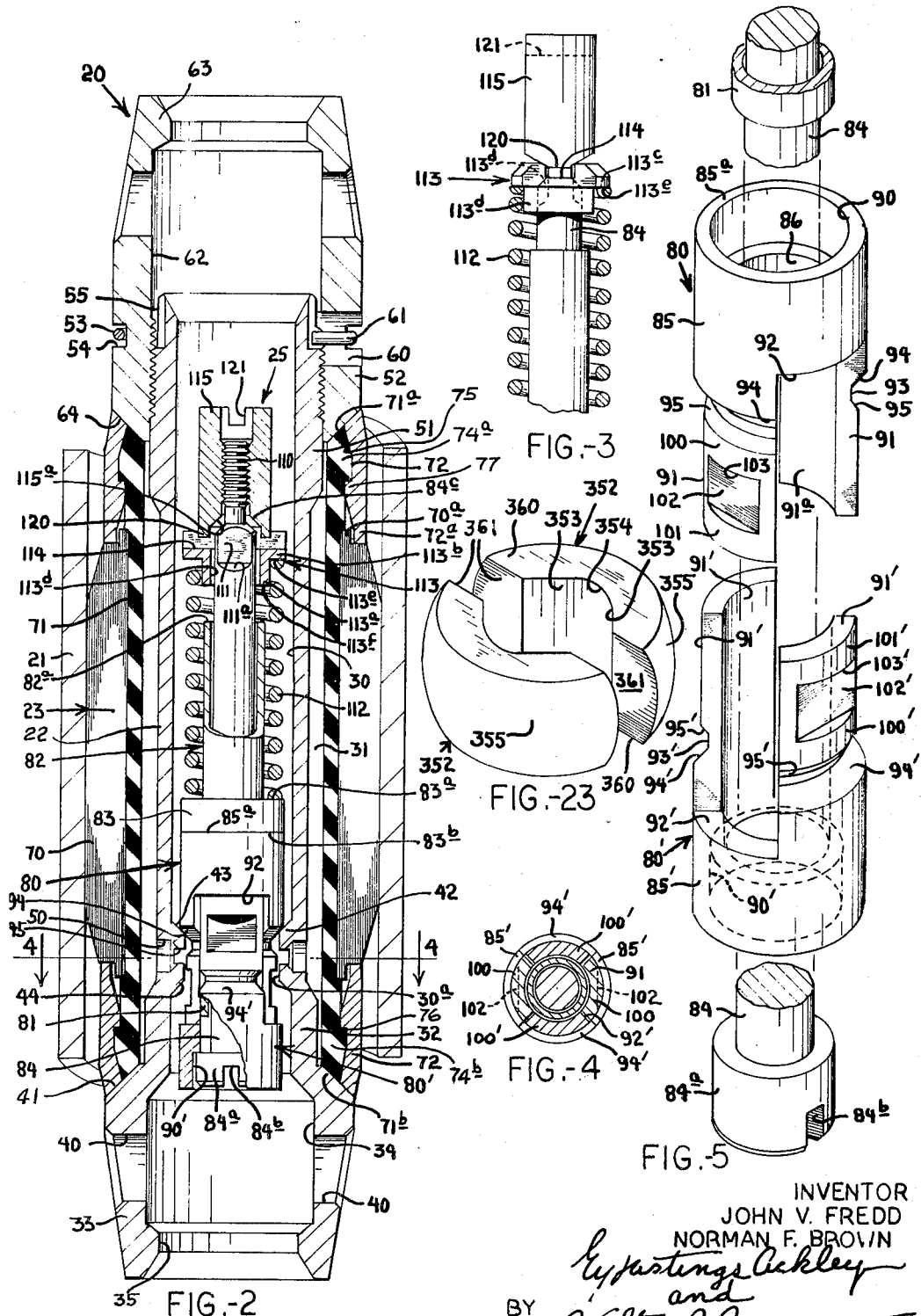

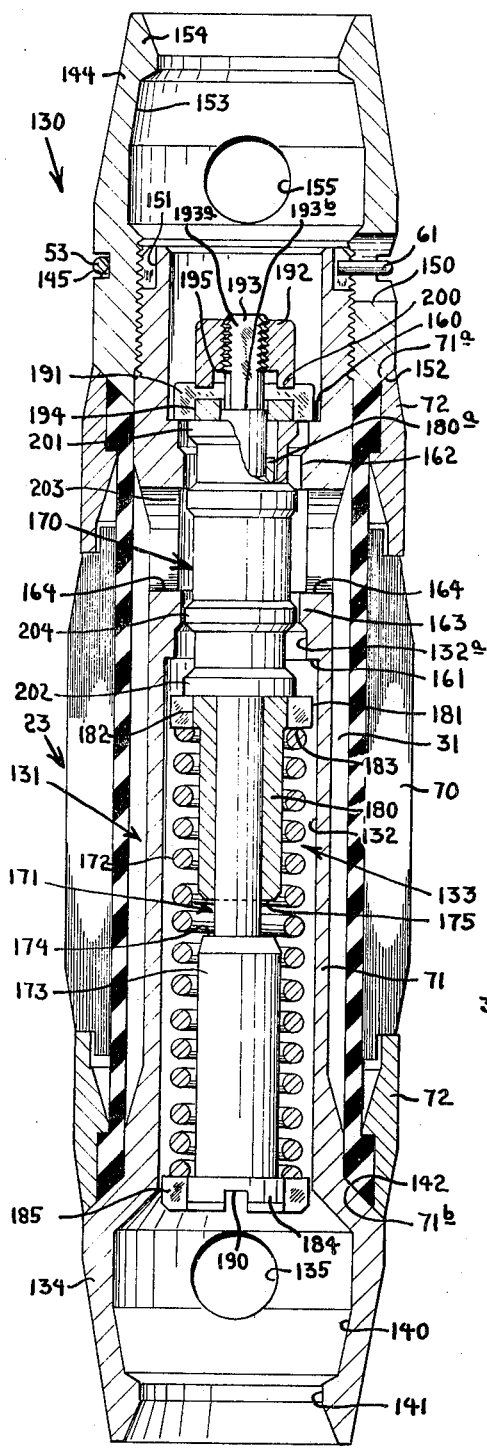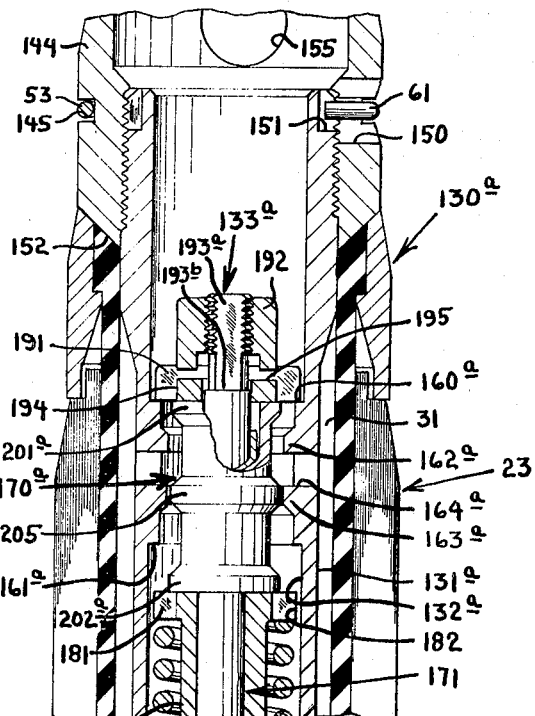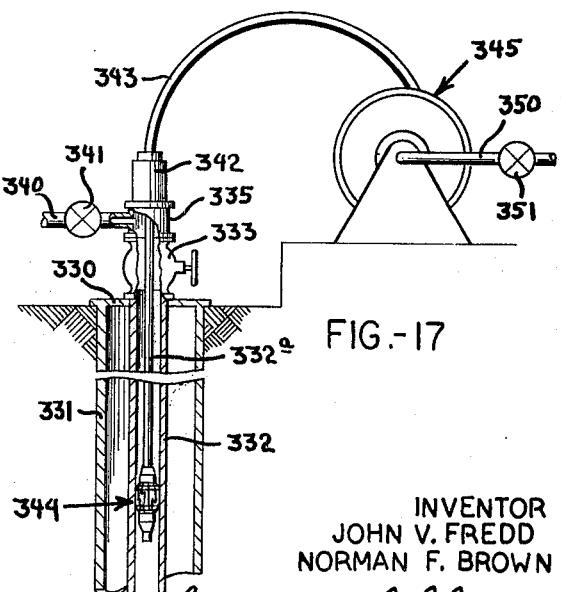

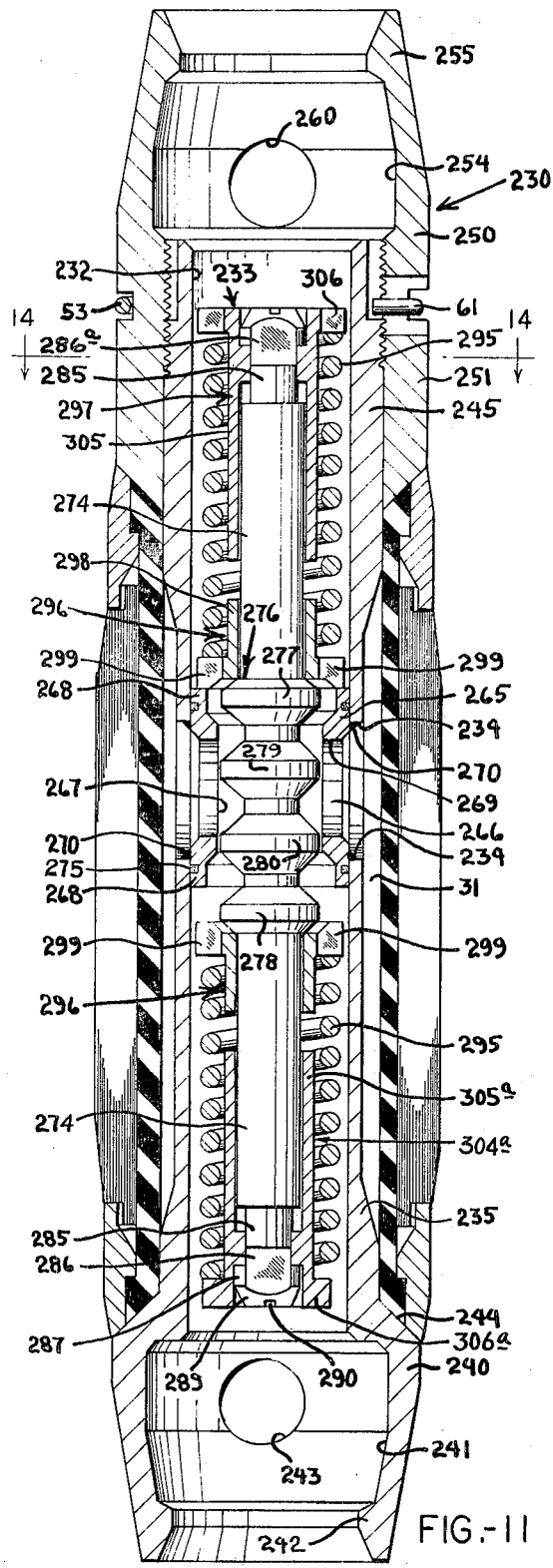
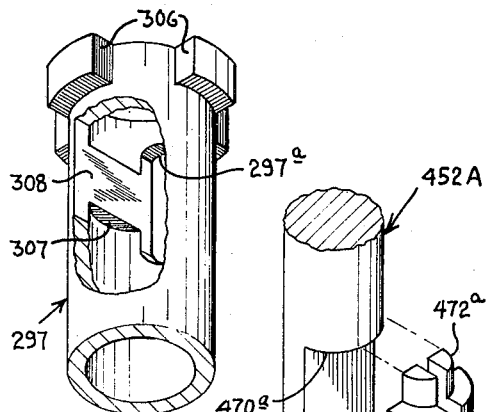
FIG.-12
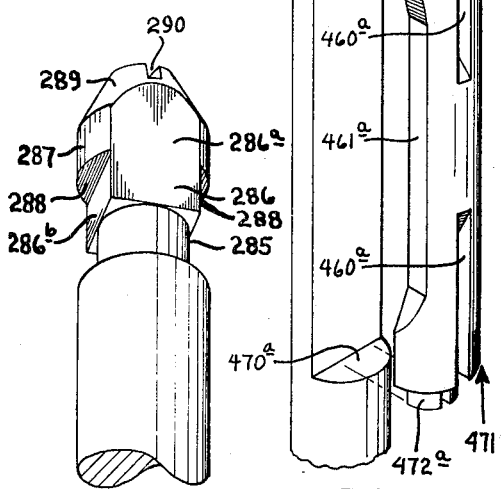
FIG.-13
FIG.-30
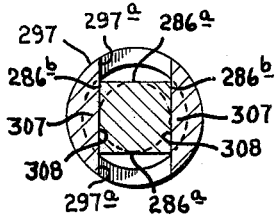
FIG.-14
FIG.-11
INVENTOR
JOHN V. FREDD
NORMAN F. BROWN
ATTORNEYS

BY

ATTORNEYS

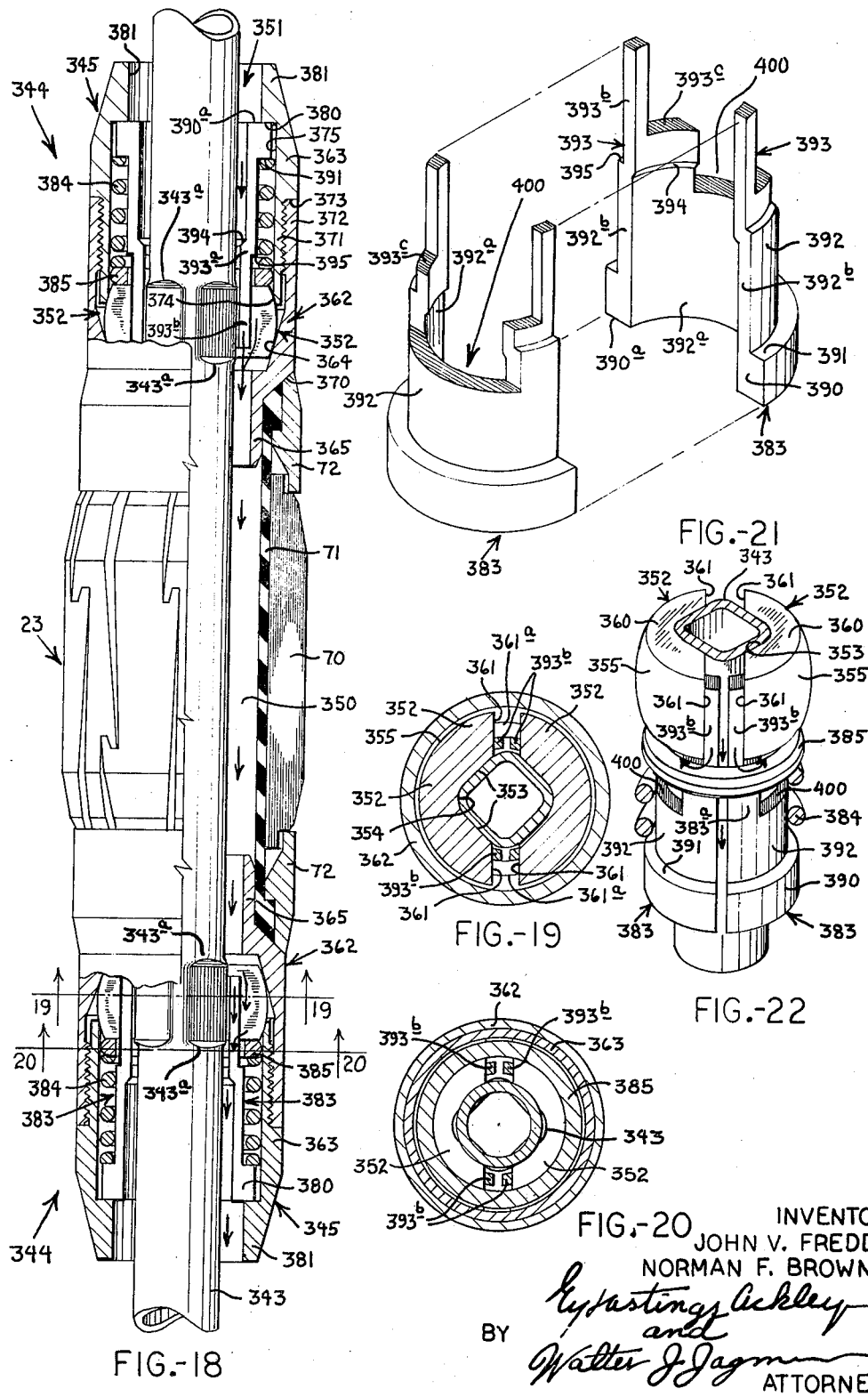

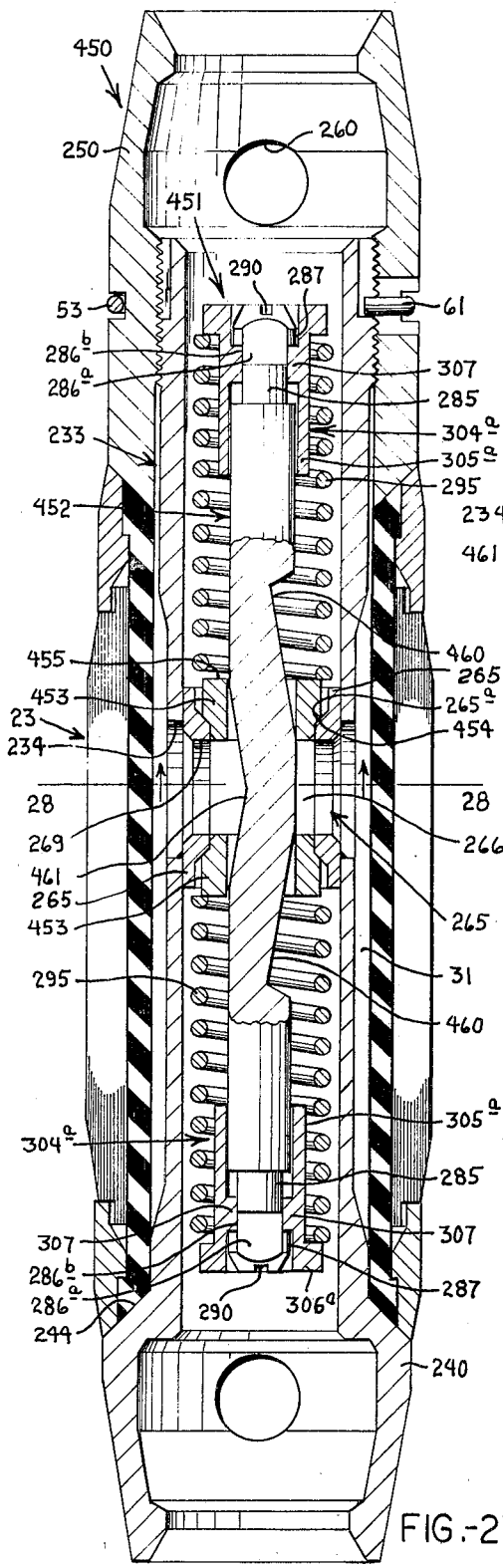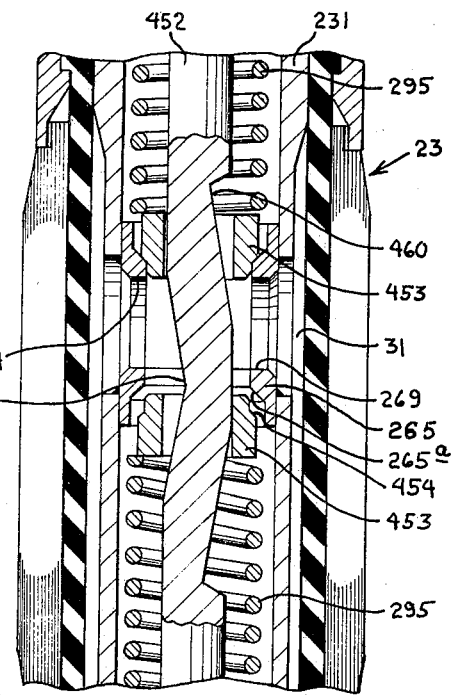
FIG.-29
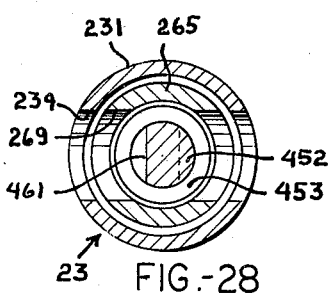
FIG.-28
FIG.-27

3,506,068
PUMPABLE IMPELLER PISTONS FOR FLOW CONDUCTORS
Norman F. Brown and John V. Fredd, Dallas, Tex., assignors to Otis Engineering Corporation, Dallas, Tex., a corporation of Delaware
Filed Apr. 20, 1967, Ser. No. 632,408
Int. Cl. E21b 33/127
U.S. Cl. 166—153                          38 Claims

ABSTRACT OF THE DISCLOSURE

A seal type pumpable tool carrier including an annular seal assembly which is expanded to seal with a conduit wall by fluid pressure in the conduit. The carrier has a mandrel provided with a central bore housing a pressure responsive longitudinally movable valve assembly for communicating the interior of the seal assembly with upstream pressure, for causing the pressure in the interior of the seal assembly to be intermediate the upstream and downstream pressure, and for communicating the interior of the seal assembly with downstream pressure. The valve provides a defined relationship between the expanding force on the seal assembly and the pressure differential applied across the tool carrier in a flow conductor. In one embodiment, a piston unit can be used to transport a flexible pipe through a tubing string.

---

This invention relates to well tools and more particularly to a well tool adapted to be pumped through a flow passage for moving objects connected thereto through the flow passage responsive to fluid pressure differentials applied across the unit.

It is one object of this invention to provide a well tool comprising a pumpable piston unit for moving apparatus connected thereto through a flow passage, such as a pipe or conduit, responsive to pressure applied across the unit by fluid pumped into the pipe behind the piston unit.

Another object is to provide a piston unit having control means responsive to the pressure differential thereacross for controlling and limiting the force of the frictional engagement of an expandable seal assembly of the unit with the internal surfaces of a flow conductor when the pressure differential is below a predetermined value and to cause the seal assembly to contract when the pressure differential exceeds the predetermined value.

Another object of this invention is to provide a pumpable piston unit including a radially expandable and contractable seal assembly and a valve for controlling the fluid pressure communicated to the seal assembly for expanding the assembly which is responsive to the pressure differential applied across the unit.

In accordance with another object of the invention the valve is movable responsive to the pressure differential thereacross between positions for causing the fluid pressure tending to move the seal assembly to expanded position to be substantially equal to the upstream fluid pressure, to be of a value intermediate the upstream and downstream fluid pressures, or to be substantially equal to the downstream fluid pressure.

It is another object of the invention to provide valve means in a pumpable piston unit which severely restricts fluid flow for effecting a pressure differential across the unit to force it along a flow conductor and to expand its seal assembly while allowing a small amount of flow through the unit so that there is always continuous circulation in the well system.

It is another object of the invention to provide a pumpable piston unit having an expandable and contractable annular seal assembly including valve apparatus which effects only partial expansion of the seal assembly when a maximum pressure differential is applied across the unit for displacing through a conduit whereby a portion of the displacing fluid is bypassed around the unit between its outer surfaces and the inner surfaces of the flow conduit for reducing the frictional resistance to movement of the unit through the conduit.

It is another object of the invention to provide a valve in a pumpable piston unit having a radially expandable and retractable seal assembly for controlling fluid pressure communication into the seal assembly responsive to a pressure differential applied across the piston unit to produce an inverse relationship between the expansion of the seal assembly and the pressure differential applied across the piston unit when such pressure differential exceeds a predetermined value.

It is another object of the invention to provide a piston unit which is pumpable through a flow conductor and includes a seal assembly and a valve movable responsive to a pressure differential applied across the piston unit for controlling pressure in the seal assembly for initial expansion of the seal assembly and subsequent contraction of the seal assembly proportional to increases in the pressure differential applied across the piston unit.

It is another object of the invention to provide a pumpable piston unit having an expandable and contractable annular seal assembly and a valve for controlling fluid pressure communication into the seal assembly which has a pair of intermeshed identical valve members spring biased together and adapted to be moved in opposite directions responsive to a pressure differential across the piston unit for selectively controlling fluid pressure communication into the seal assembly.

It is still another object of the invention to provide a pumpable piston unit adapted to be moved through a flow conductor by a pressure differential applied thereacross including an expandable and contractable annular seal on a mandrel having a flow passage and a port leading to the seal and a valve in the flow passage for controlling fluid pressure communication through mandrel ports into the seal including a spool-shaped valve member provided with spaced external annular flange portions to control flow into the port and supported in sliding relationship on a sleeve and bolt assembly spring biased to one end positioned for providing maximum fluid communication from either upstream end of the piston unit into the seal assembly while limiting communication into the seal assembly from downstream of the unit at initial end positions and movable by a pressure differential across the valve toward the downstream end of the piston unit for progressively limiting communications from the upstream end of the unit while holding the communication with the downstream end to a minimum and for subsequently permitting maximum communication from the downstream portion of the piston unit into the seal assembly while continuing to hold the upstream communication to a minimum.

It is still a further object of the invention to provide a pumpable piston unit for movement through a flow conductor having an expandable and contractable annular seal assembly and a valve for controlling fluid communication into the seal assembly including a valve rod having a central valve member connected with valve stem portions extending in opposite directions each supporting a valve spring for biasing the valve rod in either upstream direction while permitting the rod to be moved by a pressure differential across the valve in a downstream direction for varying the communication of fluid pressure into the seal assembly from both the upstream and downstream portions of the valve unit in a predetermined relationship with the pressure differential applied across the valve unit, the valve being loosely disposed within the piston unit for initial movement to communicate upstream pressure from either end of the piston unit into the seal assembly and the valve rod being subsequently movable in a downstream direction against the spring on the upstream stem portion of the valve rod for progressively decreasing upstream communication into the seal assembly while holding the communication with the downstream pressure to a minimum, and for subsequently holding the upstream communication into the seal assembly at a minimum while permitting maximum downstream communication into the seal assembly for varying the forces expanding the seal assembly from a maximum to a minimum.

It is another object of the invention to provide a servo valve mechanism for controlling fluid flow along a first flow passage responsive to flow in a second flow passage including a body having a longitudinal flow passage and a connecting lateral port, a valve communicating with the port for controlling flow in the first flow passage, and a valve member in the longitudinal flow passage biased to a neutral position and movable in a downstream direction responsive to a pressure differential for progressively communicating the lateral port with the upstream portion of the longitudinal flow passage, restricting communication both upstream and downstream of the valve member to the lateral port, and providing communication between the lateral port and downstream of the valve member for actuating the valve and controlling flow in the first flow passage.

It is still another object of the invention to provide a pumpable piston unit having an expandable and contractable seal assembly and a valve for controlling fluid communication into the seal assembly including a valve rod having biasing springs along each of its end portions and supported through a pair of spaced annular valve members each biased to a closed position around the rod by a valve spring and movable by fluid flow toward the downstream end of the piston unit to provide maximum fluid communication into the seal assembly from the downstream end of the piston unit serving a secondary valving function, the valve rod having spaced first slots or recesses for communicating the upstream portion of the piston unit with the seal assembly as the valve rod moves toward the downstream end of the piston unit and a central second recess spaced from the first recesses for communicating the seal assembly with the downstream portion of the piston unit as the valve rod moves farther in a downstream direction.

It is a still further object of the invention to provide a pumpable piston unit for transporting a flexible pipe through a flow conductor including an annular seal assembly supported around the flexible pipe between annular valve units each having components providing a variable orifice and biased to positions allowing a predetermined flow through the unit when a pressure differential below a predetermined level is applied across the unit and for movement responsive to a first predetermined increase in pressure differential across the piston unit to first enlarge the orifice at the downstream end of the unit for reducing the pressure differential between the interior of the seal assembly and downstream of the piston unit within the flow conductor and responsive to a second pressure differential increase to reduce the orifice at the upstream end of the unit for increasing the pressure differential between the interior of the seal assembly and upstream of the piston unit within the flow conductor, each annular valve unit being double acting to enlarge the orifice when at the downstream end of the piston unit and to reduce the orifice when at the upstream end of the piston unit.

It is a still further object of the invention to provide a piston unit for transporting a flexible pipe through a flow conductor including valve units each of which includes a ring shaped valve member and a sleeve type valve member having finger portions disposed through the valve ring, the valve ring being movable by a pressure differential applied thereacross in one direction to enlarge the orifice provided by each valve unit, and the sleeve type valve member being movable by a pressure differential applied thereacross in the other direction to reduce the orifice provided by the valve unit.

It is another object of the invention to provide a pumpable piston unit for displacement through a flow conductor including an annular seal assembly and a valve for controlling fluid communication into the seal assembly provided with a spring biased valve rod having a replaceable insert provided with longitudinally spaced recesses for controlling communication into the seal assembly from upstream portions of the piston unit and a central recess for controlling communication from downstream portions of the piston unit into the seal assembly.

The invention is therefore directed to apparatus such as impeller units pumpable through flow conductors and adapted to be pumped by fluids flowing through said flow conductors, including an annular expandable seal means on a supporting means pumpable for movement longitudinally of said flow conductor by fluid pressure in said conductor, means for communicating fluid pressure into said seal means for expansion of said seal means against said flow conductor wall, and means for varying the flow pressure communication into said seal means in response to fluid pressure differentials across said apparatus within said conductor comprising regulating value means operable to control the inflation and deflation of said seal means in a predetermined relationship with said fluid pressure differentials for varying interface pressure between said seal means and said flow conductor wall and permitting predetermined fluid bypass past said seal means in either direction variable under predetermined conditions.

Additional objects and advantages of the invention will be readily apparent from the reading of the following description of a device constructed in accordance with the invention, and reference to the accompanying drawings thereof, wherein:

FIGURE 1 is a longitudinal view in elevation of a piston unit embodying the invention within a flow conductor;

FIGURE 2 is a longitudinal view partially in section and partially in elevation of the piston unit of FIGURE 1 illustrating its valve assembly in a position at which it provides fluid communication from above the unit into its expandable seal assembly;

FIGURE 3 is a fragmentary longitudinal view in elevation of an upper end portion of the valve assembly of the piston unit revolved about its longitudinal axis 90 degrees from its position as illustrated in FIGURE 2;

FIGURE 4 is a view in section along the line 4—4 of FIGURE 2;

FIGURE 5 is a fragmentary exploded perspective view illustrating the configuration and relationship of the valve members of the valve assembly;

FIGURE 6 is a fragmentary view partially in section and partially in elevation of a lower portion of the piston with its valve assembly at an intermediate position for isolating its seal assembly from both upstream and downstream pressures;

Figure 24:
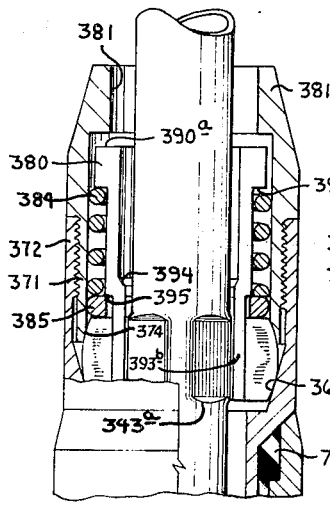
Figure 25:
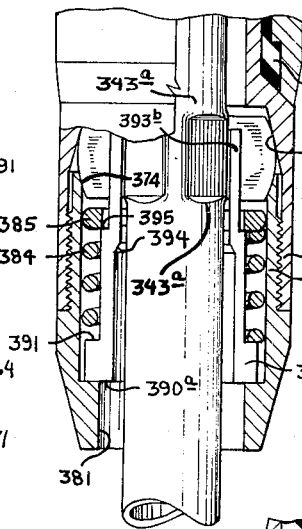
Figure 26:
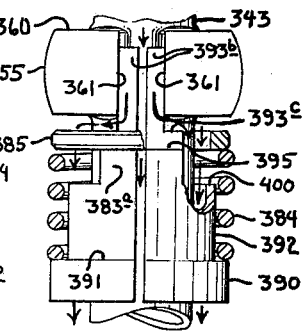
Figure 16:
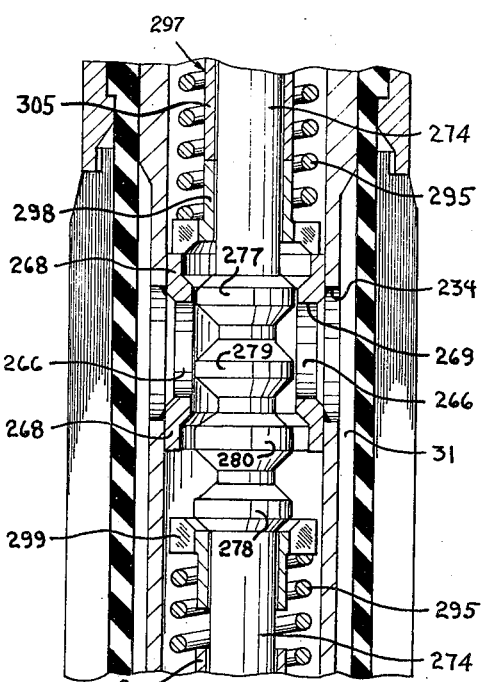
Figure 15:
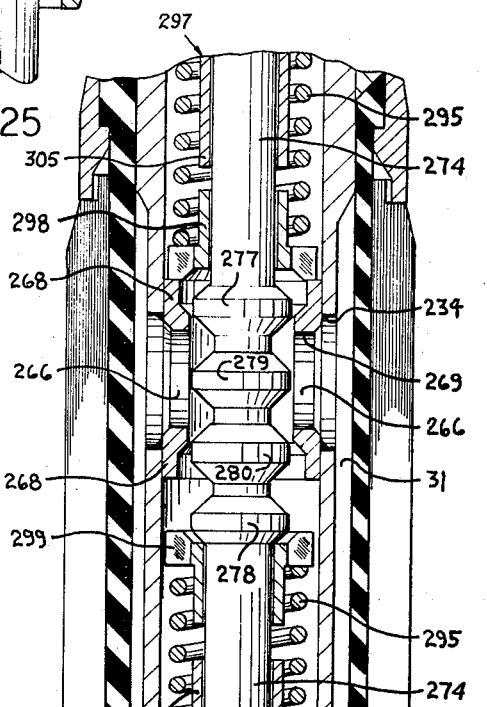

FIGURE 6–A is a side view of a portion of the piston valve as shown in FIGURE 6;

FIGURE 7 is a view similar to FIGURE 6 showing the valve assembly at a lower position for communicating the interior of the seal assembly with the downstream pressure and isolating it from upstream pressure;

FIGURE 7–A is a side view of a portion of the piston valve as shown in FIGURE 7;

FIGURE 8 is a perspective view of a spring retainer used in the piston unit of FIGURE 2;

FIGURE 9 is a longitudinal view in section and elevation of a modified form of piston unit embodying the invention;

FIGURE 10 is a fragmentary view in elevation and section of a modified form of the valve member of the piston unit of FIGURE 9;

FIGURE 11 is a longitudinal view in section and elevation of another modified piston unit embodying the invention;

FIGURE 12 is a fragmentary view in perspective with certain portions broken away of a spring retainer sleeve used in the piston unit of FIGURE 11;

FIGURE 13 is a fragmentary view in perspective of one end portion of the valve rod of the piston unit of FIGURE 11;

FIGURE 14 is a view in section along the line 14—14 of FIGURE 11;

FIGURE 15 is a fragmentary longitudinal view in section and elevation of the piston unit of FIGURE 11 showing its valve at an intermediate position to restrict fluid communication between the mandrel ports and both the upstream and downstream portions of the mandrel passageway;

FIGURE 16 is a view similar to FIGURE 15 showing the valve at an end position for maximum fluid communication between the mandrel ports and the downstream portion of the mandrel passageway while substantially limiting fluid communication between such ports and the upstream portion of the passageway;

FIGURE 17 is a schematic view in section and elevation of a portion of a well system for inserting and removing flexible pipe in a tubing string utilizing a piston unit embodying the invention;

FIGURE 18 is a longitudinal view in section and elevation of a piston unit embodying the invention used in the system of FIGURE 17 for transporting the flexible pipe in the tubing string;

FIGURE 19 is a view in section along the line 19—19 of FIGURE 18;

FIGURE 20 is a view in section along the line 20—20 of FIGURE 18;

FIGURE 21 is an exploded view in perspective of the sleeve valves halves employed in the valve units of the piston unit of FIGURE 18;

FIGURE 22 is a perspective view of one of the valve units of the piston unit of FIGURE 18 with its gland and socket members removed;

FIGURE 23 is a view in perspective of the split ring clamp employed in each of the valve units of the piston unit of FIGURE 18 for securing the unit to the flexible pipe;

FIGURE 24 is a fragmentary view in section and elevation of the upstream valve unit of the piston unit of FIGURE 18 with its components positioned to provide a maximum restriction to fluid flow through the unit;

FIGURE 25 is a fragmentary view in section and elevation of the downstream valve unit of the piston unit of FIGURE 18 with its components moved to positions to provide minimum restriction of fluid flow through the valve unit;

FIGURE 26 is a fragmentary side view in elevation of the valve unit of FIGURE 25 with its gland and socket members removed;

FIGURE 27 is a longitudinal view in section and elevation of a still further form of piston unit embodying the invention;

FIGURE 28 is a view in section along the line 28—28 of FIGURE 27;

FIGURE 29 is a fragmentary view in section and elevation showing the valve of the piston unit of FIGURE 27 moved to one end position for maximum fluid communication between the downstream portion of the mandrel passageway and the mandrel ports leading into the seal assembly; and FIGURE 30 is a fragmentary exploded view in perspective of a modified form of valve rod employed in the valve of the piston unit of FIGURE 27.

Referring to FIGURE 1, a piston unit 20 embodying the invention may be displaced in either direction through a flow conductor 20 by establishing a pressure differential across the piston unit by pumping fluid into the flow conductor in the desired direction of movement of the piston unit. The piston unit functions as a carrier for well tools, such as the tools A and B, coupled into opposite end portions of the unit.

The piston unit 20, FIGURE 2, comprises a tubular shaped mandrel 22 supporting a concentric annular seal assembly 23 which is expandable and contractable to seal between the mandrel and the inner wall surface 24 of the flow conductor. A valve 25 is positioned within the bore 30 of the mandrel for controlling fluid communication from the mandrel bore both upstream and downstream of the valve assembly into an annular chamber 31 within the seal assembly 23 around the mandrel. The valve assembly controls the relationship between the force applied to the seal assembly by the displacing fluid which tends to expand the seal assembly and the pressure differential across the piston unit so that the force tending to expand the seal assembly is not in direct proportion to the pressure differential and at relatively high pressure differentials some displacing fluid bypasses the piston unit between the flow conductor inner wall and the seal assembly. Also, the frictional resistance between the seal assembly and the flow conductor inner wall is minimized at higher pressure differentials across the piston unit due to the provision of the valve. It is not intended that the valve 25 at any time completely prevent fluid flow through the mandrel bore of the piston unit. The tolerances between the components of the valve and between the valve and the mandrel bore provide a rather loosely fitting valve which, while it severely restricts flow through the piston unit both for developing the required pressure differential across the piston unit and for providing pressure into the seal assembly, it always permits at least a minimum flow rate through the piston unit so that constant circulation is maintained in a well system in which the piston unit is functioning. As a practical matter, for example, the valve may be designed with tolerances which, even under conditions of maximum flow restriction, always provide flow passage area therethrough equivalent to an orifice of a diameter of about $3/16$ of an inch. Such minimum flow rate through the piston unit is desired for a number of reasons. For example, if a piston unit becomes lodged in a flow conductor another piston unit may be pumped through the flow conductor to aid in releasing the lodged unit if the unit which is lodged will permit sufficient flow therethrough to provide at least a minimum of flow rate in the flow conductor of the system. Also, under conditions where a plurality of piston units are arranged in end-to-end array transporting more load through a flow conductor than can be handled by a single piston unit, it is necessary in order to distribute the load over the several piston units that the piston units be capable of allowing flow therethrough in order that a pressure differential is established across each of the connected piston units. It is to be understood that in the other embodiments disclosed herein the valve is designed to permit a minimum flow rate through the piston unit in addition to fulfilling its pressure control functions.

The mandrel 22 is enlarged along a lower intermediate portion 32 and has a further enlarged lower end socket portion 33. The mandrel socket portion is provided with a locking chamber 34 communicating with the mandrel bore 30 whose lower end is defined by an internal annular locking flange 35 engageable by a locking means, not shown, on the well tool B received within the chamber 34 for coupling the piston unit and well tool. Lateral ports 40 are provided in the socket portion 33 opening into its chamber 34 for decoupling a connected tool and to allow flow into the unit if the opening through the flange 35 is obstructed. The socket 33 has an external annular downwardly divergent shoulder surface 41 to limit downward movement of and seal with the seal 23.

The mandrel has an internal annular flange 42 providing a short reduced bore portion 30a. The flange 42 has an upper downwardly convergent shoulder surface 43 and a lower upwardly convergent shoulder surface 44. The flange 42 is also provided with an internal annular recess 45 which intersects lateral ports 50 in the mandrel to provide fluid communication from the bore of the mandrel into the annular chamber 31 around the mandrel within the seal assembly 23 for expanding the seal assembly by fluid pressure from the mandrel bore.

The mandrel 22 has an upper enlarged externally threaded end portion 51 on which is threaded an upper socket member 52 releasably locked against unscrewing on the mandrel by an annular lock wire 53. The lock wire is disposed in an external annular recess 54 of the socket member. The upper end portion 51 of the mandrel has a plurality of circumferentially spaced upwardly and outwardly opening slots 55 while the upper socket member 52 has a lateral slot 60 which is alignable with one of the slots 55 when the socket member is tightened on the mandrel as shown in FIGURE 1. One of the free end portions of the lock wire 53 is bent relative to the major circular portion of the wire to form a radial locking end section 61 which extends inwardly through the socket member slot 60 into one of the slots 55 on the mandrel to lock the socket member against rotation on the mandrel.

The upper socket member has an internal locking chamber 62 which communicates with the mandrel bore 30 when the socket member is secured on the mandrel. The upper end of the chamber 62 is defined by an internal annular end flange 63 so that locking means, not shown, on the well tool A, FIGURE 1, disposed in the locking chamber are engageable with the locking flange 63 to couple the tool A to the mandrel. The lower end of the upper socket member has a downwardly and inwardly convergent annular end surface 64 which seals with and holds the seal assembly 23 against upward movement on the mandrel.

The seal assembly 23 is radially expandable and contractable to seal between the mandrel 22 and the inner wall surface of the flow conductor 21 and includes a plurality of longitudinally extending, circumferentially disposed, interlocking, rigid segments 70 formed of a material such as a metal and bonded to a flexible sleeve 71 formed of a resilient substance such as rubber. The sleeve has external end flanges 74a and 74b and the retainer rings have internal recesses 75 in which the end flanges are received. The end flanges of the sleeve are compressed between the shoulders 41 and 64 of the socket members 33 and 52 and the internal shoulders 76 of the ring flanges 77 to seal opposite ends of the chamber 31. Upper and lower end portions of the sleeve 71 are fitted into upper and lower retainers 72 which limit the radial expansion of the seal segments 70. Each of the retainers rings 72 has a lip portion 72a which overlaps an end flange portion 70a of each of the seal segments for limiting the radial outward movement of the segments. The interlocking relationship of the seal segments, as best illustrated in FIGURE 1, permits the desired expansion and contraction of the seal assembly between a substantially sealed relationship illustrated in FIGURE 1 and somewhat contracted relationship in which the seal segments are sufficiently spaced from the inner wall of the flow conductor to permit fluid flow past the piston unit within the flow conductor. Further details illustrating the structure of the seal elements and their interlocking relationship are shown in the United States Patent application Ser. No. 402,707, filed by Norman F. Brown on the 9th day of October, 1964 and allowed on the 15th day of December, 1966. A similar seal assembly having interlocking metal segments is also illustrated and described at pages 3780 and 3781 of the Composite Catalogue of Oil Field Equipment and Services, 1966–67 edition, published by World Oil, Houston, Tex. The seal assembly is expanded and contracted responsive to the fluid pressure differential applied across the assembly between its annular chamber 31 within the sleeve 71 and the space around the seal assembly within the flow conductor. The upper end edge surface 71a of the sleeve 71 seals with the lower end surface 64 of the upper socket member 52 to prevent leakage from the upper end of the annular chamber 31 while similarly the lower edge surface 71b of the sleeve 71 seals with the shoulder surface 41 on the lower socket portion of the mandrel 22 to prevent leakage from the lower end of the annular chamber 31.

The valve 25 controls fluid communication between the mandrel bore 30 and the annular chamber 31 within the seal assembly. The valve is loosely disposed within the bore 30 of the mandrel for longitudinal movement between positions for communicating either upstream or downstream pressure into the chamber 31 responsive to displacing fluid directed through the flow conductor toward either end of the piston unit. The valve includes identical upper and lower valve members 80 and 80′, respectively. The lower valve member has identical features as the upper valve member 80 identified by the same reference numerals to which a prime (′) mark has been added. The valve members are supported on a lower end portion 81 of a sleeve 82 below its external annular flange 83 by a bolt 84. The lower valve member 80′ controls fluid communication into the chamber 31 from the bore 30 of the mandrel above the flange 42. Similarly, the upper valve member 80 controls fluid communication into the chamber 31 from the bore 30 below the flange 42.

Referring particularly to FIGURE 5 the upper valve member 80 has a cylindrical head portion 85 provided with a bore 86 which is of a diameter providing a close sliding fit of the valve member on the lower sleeve portion 81. The bore of the valve member has an enlarged or counter bore end portion 90. A pair of longitudinal fingers 91 are dependent from the body portion 85 circumferentially spaced substantially 180 degrees apart defining therebetween a pair of oppositely disposed downwardly opening slots 92. The inner surface portion 91a of each of the fingers 91 is a segment of a cylindrical surface which is coincident with the inner surface defining the bore 86 of the valve member so that the inner surfaces of both the fingers 91 extend in sliding relationship along the outer surface of the sleeve portion 81. Each of the fingers has an external recess portion 93 defined between a downwardly and inwardly sloping shoulder surface 94 and an upwardly and inwardly sloping shoulder surface 95. The fingers are each reduced along their external surface portions below the shoulder surface 94 so that when fitted on the lower sleeve portion 81 they will pass through the mandrel flange 42 in the reduced bore portion 30a to the position at which their shoulder surface 94 engages the flange shoulder surface 43. Each of the fingers 91 has external longitudinally spaced intermediate and end flanges 100 and 101, respectively. Between the flanges 100 and 101 each finger 91 has an external flat surface portion 102 in a plane parallel to longitudinal axis of the valve member and perpendicular to a radius line drawn from the longitudinal axis to the longitudinal center line of the fingers. The surface portion 102 with the adjoining edge surfaces of the flanges 100 and 101 define an external recess 103 in each of the fingers 91. The outer surfaces of the flange portions 100 and 101 on each of the fingers are cylindrical surface segments of equal radii and which cooperate with the mandrel bore surface of the reduced portion 30a above and below the recess 45 to direct displacing fluid into the recess from above or below the valve depending upon its position in the mandrel.

As previously stated, all features of the lower valve member 80′ are identical to those of the upper valve member 80. The upper and lower valve members are supported in mated or meshed relationship on the lower sleeve portion 81 by the bolt 84 whose head 84a is received in the counter bore 90' of the lower valve member. The valve members are disposed in opposite directions longitudinally and each is positioned at a 90 degree angle relative to the other with respect to their common longitudinal axis so that the fingers 91 of the upper valve member are received within the slots 92' of the lower valve member and the fingers 91' of the lower valve member are received in the slots 92 of the upper valve member. The valve members are movable longitudinally toward and away from each other on the sleeve portion 81 responsive to fluid pressure differentials applied from end-to-end across the valve in the mandrel bore 30. When the valve members are fully compressed together FIGURES 2 and 4, the intermediate flange portions 100' on the lower valve member are longitudinally aligned with the intermediate flange portions 100 on the upper valve member substantially but not completely closing the mandrel bore portion 30a.

The bolt 84 has a threaded reduced upper end portion 110 and a pair of flat parallel side surfaces 111 along opposite sides of the bolt adjacent to its reduced end portion. A spring 112 is confined on the sleeve 82 and bolt 84 between the sleeve flange 83 and a spring retainer 113. The spring retainer includes a lower tubular body portion 113a and a larger head portion 113b which is generally square in shape in a horizontal plane with respect to FIGURE 2 and has beveled corner edges 113c. A downwardly opening bore 113d extends a portion of the way through the spring retainer intersecting a lateral upwardly opening slot 114 having vertical side surfaces 114a spaced apart a slightly greater distance than the surfaces 111 on the bolt. The bolt 84 and spring retainer are so related that the full diameter portion of the bolt below the surfaces 111 may be received in the bore 113d while the portion of the bolt along the surfaces 111 extends through the retainer in the slot 114.

The spring retainer 113 is held on the bolt by a nut 115 threaded on the reduced bolt portion 112. The nut has a pair of spaced dependent tabs or ears 120 provided by chamfering the lower end edge surfaces of the nut along opposite sides. The tabs 120 project into the upper portion of the slot 114 when the spring retainer is held by the spring 112 at its upper end position against the nut. The nut and the spring retainer coact to provide the function of a detent which holds the nut against rotation on the bolt portion 110 so long as the spring retainer is biased against the nut by the spring while also permitting the nut to be rotated to unscrew it when sufficient rotational force is applied to the nut to overcome the resistance of the spring. The chamfered lower edge surfaces of the tabs 120 cam the spring retainer downwardly against the spring when sufficient rotational force is applied to the nut for removing it or adjusting its position on the bolt for varying the compression of the spring 112. A lateral slot 121 is provided in the upper end of the nut 115 to receive a screw driver or similar tool for rotating the nut.

When the valve 25 is assembled as shown in FIGURE 2 the lower end of the spring 112 is supported on the upper shoulder surface 83a of the flange 83 on the sleeve 82 while the upper end of the spring engages the lower shoulder surface 113e on the spring retainer 113. The upward force of the compressed spring 112 on the spring retainer biases it against the tabs 120 on the nut 115 applying an upward force to the nut. The nut 115 tends to lift the bolt 84 relative to the sleeve 82 since the lower end of the spring 112 is bearing against the flange 83 on the sleeve. The bolt head 84a is received within the counter bore 90' of the lower valve member 80' biasing the lower valve member upwardly on the lower sleeve portion 81. The upper valve member 80 is confined between the lower shoulder surface 83b on the flange 83 of the sleeve 82 and the lower valve member while both valve members are biased longitudinally in opposite directions to a fully mated relationship in the absence of a fluid pressure differential which moves one of the valve members relative to the other, as discussed hereinafter. When the upper and lower valve members are in the position illustrated in FIGURE 2, the distance between their respective shoulder surfaces 94 and 94' is greater than the distance between the mandrel shoulder surfaces 43 and 44 on the internal flange 42 within the mandrel 22. The valve is longitudinally movable as a unit between one end position as shown in FIGURE 2 and an opposite end position within the mandrel without affecting the positions of the upper and lower valve members with respect to each other. The opposite end positions permit the chamber 31 within the seal assembly 23 to be in maximum fluid communication with the upstream pressure of displacing fluid introduced into either end of the piston unit while the seal assembly chamber is substantially isolated or communication is reduced to a minimum from downstream pressure transmitted into the other end of the piston unit.

The diameter of the body portions 85 and 85' of the upper and lower valve members, respectively, is greater than the diameter of the bore portion 30a of the internal mandrel flange 42 thereby necessitating the assembly of the valve 25 within the bore of the mandrel. The lower valve member along with the bolt 84 are inserted into the bore of the mandrel through its portion 30a from below the flange 42 while the upper valve member and the sleeve 82 are placed in the mandrel bore from above the flange. In a preferred sequence of assembly steps, the bolt 84 is inserted through the lower valve member until its head 84a is within the counter bore portion 90' of the valve member and the assembled bolt and valve member are then inserted into the lower end of the bore of the mandrel through its portion 30a. The upper valve member 85 is then dropped through the upper end of the mandrel bore over the bolt 84 until its shoulder surface 94 engages the internal mandrel shoulder 43. The upper and lower valve members are manipulated until the fingers of each valve member enter their respective recesses of the other valve member position the valve members in the mated relationship of FIGURE 2. The sleeve 83 is placed through the upper end of the mandrel bore over the bolt 84 above the flange 42. The sleeve is manipulated until its lower portion 81 is within the mated valve members with the lower shoulder surface 83b of the sleeve flange 83 engaging the upper end surface 85a of the upper valve member. The spring 112 is placed in the mandrel bore over the bolt and sleeve 82 until the lower end of the spring rests on the shoulder 83a of the sleeve flange 83. The spring retainer 113 is placed over the upper end of the bolt 84 until the retainer sleeve portion 113a is within the upper end portion of the spring with the upper end of the spring engaging the flange surface 113e of the spring retainer. The nut 115 is then screwed on the threaded end portion 110 of the bolt until the nut tabs 120 engage the lateral slot 114 of the spring retainer with the nut being tightened until the spring is compressed between the shoulders 83a on the sleeve 82 and the flange surface 113e on the spring retainer to a predetermined value determined by the pressure at which it is desired the valve function. After the nut is screwed on the bolt to the point where it initially engages the spring retainer with its tabs 120, the nut is further rotated to effect actual compresssion of the spring until the spring has been compressed to the extent desired. During rotation of the nut, the retainer is cammed downwardly against the force of the spring each half turn of the nut due to the tapered configuration of the lower edge surfaces of the tabs so that the tabs move out of the lateral retainer slot freeing the nut for rotation on the bolt. In positioning the spring retainer on the bolt the portion of the bolt along its flat surfaces 111 passes through the bore 113d of the retainer and enters the slot 114 through the retainer. The bolt surfaces 111 hold the retainer against rotation on the bolt while the nut 115 is rotated on the bolt.

The various components of the valve including the sleeve 82 and the spring retainer 113 are proportioned to permit the spring 112 to be compressed the required distance with sufficient space left between the lower end surface 113f of the spring retainer and the upper end surface 82a of the sleeve 82 for the required movement of the upper and the lower valve members during the functioning of the valve. When rotating the nut 115 for adjusting the compression of the spring 112, the bolt 84 is held against rotation by use of a suitable tool, such as a screw driver, inserted into a lateral slot 84b provided in the head of the bolt, FIGURE 2. It will be clear that the extent to which the nut 115 may be screwed on the bolt 84 is limited by the engagement of the lower end surface 50a of the nut with the upper end surface 84c on the full diameter portion of the bolt at the base of its reduced threaded end portion 110. The spring retainer 113 is movable downwardly on the nut only until the bolt shoulder surfaces 111a engage the upper end of the bore 113d within the spring retainer. The biasing force applied by the spring 112 affecting the operating characteristics of the valve is determined both by the extent to which the spring is compressed and the character of the spring itself. Thus, if a particular spring does not provide the desired biasing force within limits to which the spring may be compressed, the valve operating conditions may be varied by selection of another spring.

The piston unit 23 is used to transport tools, instruments, and the like through a flow conductor as schematically illustrated in FIGURE 1. The flow conductor may be, for example, the tubing in a well with the piston unit serving to transport well tools from the surface end of the well to a particular location within the well at which the well tools discharge their function. A well equipped for pumping tools in this manner may include a pair of parallel tubing strings which communicate with each other below a landing nipple into which the well tools are pumped and locked so that either of the tubing strings may serve as a displacing fluid supply conductor or a fluid return conductor, allowing fluid flow in either direction for pumping the piston unit to the landing nipple and returning it to the surface.

The piston unit along with well tools to be transported through the flow conductor are coupled together to form a tool train and inserted into the flow conductor. Displacing fluid is pumped into the conductor behind the tool train to force it through the conductor to the landing nipple. Generally, there is an interference fit between the segments 70 of the seal assembly 23 and the inner wall surface of the flow conductor initially establishing a line of sealing between the seal assembly and the flow conductor wall upon insertion of the piston unit into the conductor before the unit is subjected to displacing fluid pressure. The valve 25 fits loosely within the bore 30 of the piston unit mandrel and so long as the pressure differential across the valve from end to end is insufficient to compress the spring 112, the force of the spring acting on the sleeve shoulder surface 83a and the spring retainer shoulder surface 113e holds the upper and lower valve members compressed together longitudinally, FIGURE 2, so that the valve member flange positions 100 and 100' are aligned longitudinally so that the cross sections of the valve members combine to form substantially solid structure, FIGURE 4. Since the valve is so loosely fitted within the piston unit mandrel, gravity and the initial flow of displacing fluid into the unit moves its valve to the position shown in FIGURE 2 at which the shoulder surfaces 94 on the fingers of the upper valve member 89 rest on the upper shoulder surface 43 of the internal flange 42 within the mandrel bore 30. At this position of the valve assembly the intermediate flange portions 100 and 100' on the upper and lower valve members are in longitudinal alignment with each other within the bore portion 30a slightly below the recess 45 in the flange 42. The valve members substantially close the bore portion 30a around the bolt 84 and lower sleeve portion 81 thereby severely restricting, though not completely closing off, fluid flow within the mandrel bore downwardly around the valve members past their flange portions 100 and 100'. While fluid flow in the mandrel below the flange 42 is restricted, the bore of the mandrel above the flange 42 freely communicates with the seal assembly chamber 31. The upper portions of the recesses 103' in the upwardly extending fingers 91' of the lower valve member open into the mandrel bore above the flange 42 while the lower portions of such recesses communicate with the recess 45 in the flange 42 so that fluid pressure within the mandrel bore above the flange is communicated downwardly along the fingers of the lower valve member through their recesses 103' into the recess 45 of the mandrel and outwardly through the lateral ports 50 of the mandrel into the internal annular chamber 31 of the seal assembly 23. Thus, as the pressure of the displacing fluid entering the upper end of the piston unit increases the flexible sleeve 71 of the seal assembly is expanded urging its seal elements 70 more tightly against the wall of the flow conductor.

With the valve at the position of FIGURE 2, the pressure within the flow conductor below the line of sealing engagement of the seal assembly 23 with the flow conductor wall and within the piston unit below the flange portions 100 and 100' of the valve assembly of the piston unit may increase slightly due to the leakage past the valve as the displacing fluid pressure increases, the rate of such increase remains substantially below the rate of increase in the displacing fluid pressure. When the pressure differential across the piston unit, that is, from above the unit to below the unit, is sufficient to provide a downward force on the unit exceeding the frictional resistance between the seal assembly 23 and the flow conductor wall plus such frictional resistance as there may be between the flow conductor wall and the tools connected with the piston unit, the piston unit starts moving downwardly in the flow conductor carrying the coupled well tools with it. The fluid pressure in the flow conductor above the tool 20 now being equal to or only slightly greater than the pressure in the chamber 31 while the pressure below the well tool is lower than the pressure in the chamber due to a small effective orifice between the valve and the mandrel flange 42, the seal element is biased outwardly by the force of the fluid pressure in the chamber 31 due to the pressure differential thus created between its internal and external surfaces exposed to the chamber pressure and the downstream pressure respectively.

The valve remains at the position of FIGURE 2 until the downward force from the pressure differential in the displacing fluid on the bolt 84 and the lower valve member 80' exceeds the resistance or holding force of the spring 112 on the bolts 84a which supports the lower valve member against downward movement while the bolt itself is held against downward movement by the nut 115 which engages the spring retainer 113 resting on the spring 112. The spring in turn is supported on the flange 83 of the sleeve 82 while the flange is supported on the upper valve member whose finger shoulder surfaces 94 rest on the mandrel flange surface 43. When the fluid pressure differential between the upstream and downstream ends of the piston unit exceeds a predetermined value determined by factors including the characteristics and adjustment of the spring 112, the lower valve member 80' along with the bolt 84 are moved downwardly. The downward movement of the bolt pulls the nut 115 downwardly forcing the spring retainer 113 to compress the spring 112 which is being held against downward movement at its lower end by engagement with the shoulder surface 83a on the sleeve 82. The shoulder 83 is held against downward movement by engagement with the upper end surface of the upper valve member whose shoulder surfaces 94 on its fingers 91 remain seated against the internal annular shoulder surface 43 of the mandrel 22. While the upper valve member remains stationary the lower valve member is moved downwardly so that the relationships between the flange portions 100' and 101' and the recesses 103' on the fingers 91' are changed relative to the corresponding features of the upper valve member fingers 91 and the mandrel flange. The upper flange portions 101' are moved downwardly relative to the mandrel flange 42 so that the portions of the finger recesses 103' extending above the flange 42 are progressively reduced as the lower valve member moves downwardly thereby restricting the effective orifice of the pasage between the valve and the mandrel above the recess 45. When the flange portions 101' on the lower valve member fingers enter the reduced bore portion 30a above the flange recess 45, FIGURE 6, the effective orifice between the mandrel and the valve above the flange recess 45 is severely restricted so difference in the pressure within the chamber 31 and the pressure in the mandrel above its flange increases. The effective orifice of the passage between the valve and the mandrel below the recess 45 also remains restricted so that the effective force with which the seal element is biased outwardly toward engagement with the flow conductor remains substantially constant or increases only slightly as the pressure differential across the piston unit is increased and causes the valve to move downwardly. It will thus be apparent that in this position of the lower valve member the valve provides maximum restriction in the mandrel both above and below the recess 45 to flow of fluids through the mandrel and past the valve, so that the pressure within the chamber is at a value between the upstream and downstream pressures.

The pressure differential is across the piston unit, and therefore the value increases either due to a decrease in pressure downstream of the piston unit, or an increase in pressure upstream of the unit or a combination of both a downstream pressure decrease and an upstream pressure increase.

Further increases in the displacing fluid pressure to a value above the predetermined value force the lower valve member along with the bolt 84 downwardly to the lower end position illustrated, FIGURE 7. The flange portions 100' on the fingers of the lower valve member are moved to a position below the flange 42 so that the mandrel bore 30 below the flange communicates through the recesses 103' of the fingers into the ports 50 in the mandrel. Downstream pressure within the flow conductor below the piston unit is therefore freely communicated into the seal assembly chamber 31. The flange portions 101' on the fingers remain within the reduced bore portion 30a above the flange recess 45 and in cooperation with the fingers 91 of the upper valve member restrict the transmission of the upstream pressure into the seal assembly annular chamber so that the pressure in the chamber 31 becomes substantially the downstream pressure.

As the force biasing the seal assembly 23 outwardly toward the inner wall of the flow conductor is thus decreased as the valve reaches the position wherein the pressure within the chamber is caused to be less than the upstream pressure the seal assembly is contracted so that the segments 70 of the assembly are displaced inwardly from the flow conductor allowing the displacing fluid to bypass downwardly around the piston unit between the flow conductor wall and the seal assembly segments.

The limitation of the force with which the seal assembly engages a flow conductor as the pressure differential across the piston unit increases fulfills two particularly important functions. First, the limitation of the frictional force between the seal assembly elements and the inner wall of the flow conductor facilitates the movement of the piston unit through the conductor by remaining substantially constant, limiting the increase in, or actually reducing the frictional drag between the seal assembly elements and the flow conductor wall as the pressure differential across the piston unit is increased. If desired, the pressure relationship established upstream and downstream of the unit and within the chamber as the valve reaches the intermediate position may be such that the seal assembly may move to a slightly retracted position to permit a thin annular film of displacing fluid to flow or be disposed between the seal assembly element and the conductor wall surface and such fluid film will of course further reduce such frictional drag. The seal assembly, however, will still close the space between the well tool and the flow conductor to such degree that the upstream displacing fluid will move the tool downwardly in the flow conductor. Second, the bypassing of the piston unit by displacing fluid between its seal assembly and the flow conductor wall surface when the valve moves to the position illustrated in FIGURE 7 serves a safety function which may prevent rupture of the sleeve 71 of the seal assembly under such conditions as when the tool train including the piston unit becomes lodged within the flow conductor.

The functioning of the valve assembly in the piston unit has been described in terms of its making distinct moves between the positions of FIGURES 2, 6 and 7. It is to be understood, however, that the conditions under which the piston unit normally will be operated often does not result in the valve remaining at any one of these positions more than momentarily. The valve may fluctuate between positions to serve as a regulating valve adjusting the pressure in the chamber dependent upon the operating conditions encountered by the piston unit as it traverses a flow conductor. For example, under light load conditions, such as where the load being transported by the piston unit is small and the flow conductor is substantially straight so that frictional resistance to movement of the piston unit is at a minimum, the piston unit may be moved at a sufficiently rapid desired rate by a relatively low pressure differential thereacross lower than that necessary to shift the valve assembly to its intermediate or end position. On the other hand, if the pressure of the displacing fluid is increased very rapidly, the valve assembly may shift quickly to communicate the interior of the seal assembly with the downstream pressure to prevent imposition of excessive forces in the seal assembly and the piston unit, or if the seal assembly is coupled with well tools imposing a relatively heavy load on it, the resistance to movement of the piston unit and tools in the flow conductor may require a relatively great pressure differential across the piston unit to move the piston unit and the tools connected thereto through a flow conductor. It will also be apparent that if the pressure differential across the piston unit exceeds a predetermined value, the seal assembly will be moved to its contracted position permitting downward flow of fluid about and past the piston unit in the flow conductor. At regulating differential the value is constantly seeking a balance of forces by controlling inflation of the element. Any tendency toward an increase in differential causes a throttling of inflating fluid and simultaneous release downstream of fluid from within the element chamber. Conversely, a decrease in differential will permit the valve to move in the upstream direction, increasing inflation and reducing dumping. This inflationary control thus permits a small volume of fluid flowing through the valve to act in a servo manner to regulate a large volume of fluid bypassing the piston unit externally. A few cupfulls of fluid passing through the valve can maintain essentially constant differential across the piston unit as bypassing fluid volume varies between a few gallons per minute to several barrels per minute. Since the differential remains constant, the theoretical pulling capability also remains constant. However, the bypassing fluid that is flowing in the interface between the exterior of the element and the tubing wall should greatly reduce frictional drag and thereby greatly increase efficiency of the piston unit.

The piston unit is readily pumpable in either direction in a flow conductor. While its operation described above is considered in terms of its being pumped downwardly in a flow conductor of a well with the displacing or upstream fluid pressure being applied in the flow conductor above the piston unit, the piston unit is readily returned upwardly in the flow conductor by reversing the direction of flow of the displacing fluid. In a well equipped as previously described for displacing fluid flow in either direction, the fluid is pumped downwardly in the well bore annulus around the tubing string into bottom cross-over facilities below the piston unit and upwardly in the tubing string comprising the flow conductor.

The initial application of the displacing fluid pressure to the lower end of the piston unit applies a pressure differential across the valve 25 lifting it upwardly until the finger shoulder surfaces 94' on the lower valve member engage the lower shoulder surface 44 on the flange 42 within the mandrel. When the shoulder surfaces 94' on the lower valve member engage the surface 44, the valve member finger flange portions 100 and 100' are aligned longitudinally with each other and within the reduced mandrel bore portion 30a above the flange recess 45 substantially isolating the downstream pressure in the mandrel bore above the flange 42 from the recess 45 while the upstream pressure from below the piston unit is transmitted through the finger recesses 103 of the fingers of the upper valve member through the recess 45 and ports 50 into the chamber 31 of the seal assembly. At this initial upper position of the valve assembly, prior to the compression of the spring 112, the head 84a of the bolt 84 within the counter bore 90' of the lower valve member limits the upward movement of the bolt relative to the lower valve member when the lower valve member seats against the mandrel shoulder surface 44 so that the bolt acting through the nut 115, the spring retainer 113, and the spring 112, the lower end of which is engaging the flange 83 on the sleeve 82, holds the sleeve against upward movement. The upper end surface of the upper valve member 80 engages the lower face 83b of the flange 83 limiting the upward movement of the upper valve member so that the shoulder surfaces 94 on its downwardly extending fingers 91 are spaced a short distance above the mandrel shoulder surface 43 on the upper face of the flange 42 in the mandrel. The pressure differential between the chamber and the flow conductor above the piston unit expands the seal assembly 23 in the same manner as the assembly is expanded in pumping the piston unit downwardly in the flow conductor. At this position of the valve assembly the higher upstream pressure is within the recess 45 below the valve member flange portions 100 and 100' while above such flange portions within the mandrel bore 30 downstream pressure exists so that when the pressure differential across the pump unit is further increased the upper valve member 80 along with the sleeve 82 are lifted by a force resulting from the pressure differential across the valve member applied to the valve member over a cross sectional area measured through its flange portions 100 of its fingers 91 and the cross sectional area of the lower portion 81 of the sleeve 83 at the flange 42 above its recess 45. Since the bolt 84 is being held against upward movement the sleeve 82 and the upper valve member are lifted against the force of the spring 112 with the lower end flange portions 101 on the upper valve member fingers entering the restricted bore portion 30a below its recess 45 progressively increasing the pressure differential between the chamber 31 of the seal assembly and the flow conductor below the piston unit. So long as the flange portions 100 on the upper valve member fingers remain within the restricted bore portion 30a above the recess 45 so that the pressure in the chamber 31 is of a value intermediate the values of the upstream and downstream pressure. Additional increases in the upstream pressure lift the upper valve member and sleeve against the spring with the upper valve member flange portions 101 moving farther upwardly within the restricted bore portion 30a below its recess 45 while the flange portions 100 move above the restricted bore portion 30a to a position above the flange 42 within the mandrel. The chamber 31 of the seal assembly communicates through the recesses 103 of the upper valve member fingers with the mandrel passage above the valve and the pressure in the chamber is therefore substantially equal to the downstream pressure in substantially the same manner as discussed above in connection with pumping the piston unit downwardly in the flow conductor.

If it is assumed that during the operation of the piston unit that the downstream pressure below the piston unit remains constant as the upstream pressure above the piston unit is increased at the initiation of operation of the apparatus the valve assembly is in the position illustrated in FIGURE 2 and substantially the full upstream pressure is communicated to the chamber 31 so that the effective force with which the seal assembly is expanded outwardly and held in engagement with the internal surfaces of the flow conductor increases as the upstream pressure in the same ratio or proportion, it being apparent that such effective force is equal to the radially outward force exerted on the sleeve by the pressure within the chamber 31 less than the force of the upstream pressure applied over the radially outwardly facing surfaces of the seal assembly above the line of sealing engagement of the seal assembly with the internal surfaces of the flow conductor and of the downstream pressure exerted on the external radially outwardly facing surfaces of the seal assembly below the line of sealing engagement with the internal surfaces of the flow conductor.

It will be apparent that no pressure differential now exists across the upper portion of the seal assembly above the line of its sealing engagement with the flow conductor since the pressure in the chamber is equal to the upstream pressure. A pressure differential does exist across the lower portion of the seal assembly below such line of sealing engagement since the pressure in the chamber is higher than the downstream pressure. As a result, the seal assembly is expanded and held in engagement by the force which varies with the differential between the chamber and downstream pressures.

As the upstream pressure is increased to such value that the pressure differential across the valve causes the valve to move downwardly toward its intermediate position, the orifice of the mandrel passage or bore above the mandrel ports is gradually decreased and the pressure in the chamber 31 will not increase at the same rate as upstream pressure due to such restriction and when the valve reaches its intermediate position, the pressure in the chamber 31 which may now be higher value that it was immediately prior to the downward movement of the valve, however, is lower than the upstream pressure. As a result, a first pressure differential is created across the upper portion of the seal assembly above the line of its sealing engagement with the internal surfaces of the flow conductor since the pressure within the chamber 31 is less than the upstream pressure and this pressure differential exerts a force on the seal assembly tending to move it to its contracted position. The pressure differential across the lower portion of the seal assembly below its line of sealing engagement since the pressure in the chamber 31 is now higher and, therefore, effective force with which the seal assembly is being urged into its expanded position may remain unchanged. As the pressure differential across the piston unit increases the effective orifices of the mandrel bore, above and below the mandrel ports, are so related that the increase in the force exerted on the seal assembly by the pressure differential across the lower portion of the seal assembly is exactly equal to the increase in the force exerted on the upper portion of the seal assembly by the pressure differential across the lower portion of the seal assemblies.

If the effective orifice of the mandrel bore above the mandrel ports is restricted to such degree, when the valve is in its intermediate position, that the force exerted by pressure differential across the upper portion of the seal assembly increases at a greater rate than the pressure differential across the lower portion of the seal assembly as the upstream pressure in increased, the effective force tending to hold the seal assembly in engagement with the internal surfaces of the flow conductor may actually decrease. Conversely, if the effective orifice of the mandrel bore above the ports is increased, when the valve is in its intermediate position, to such degree that the pressure differential across the upper portion of the seal assembly increases at a lower rate than the increase in the pressure differential across the lower portion of the seal assembly as the upstream pressure is increased, the effective force tending to expand the seal assembly will increase but at a much lower rate than if there were no such restriction of the orifice of the mandrel bore above its ports.

It will be apparent that while it was assumed that the downstream pressure remained constant, it may also vary and the net effective force biasing the seal assembly to its expanded position and into engagement with the internal surface of the flow conductor may vary in accordance with several factors thus providing for great flexibility of operation of the unit to permit its operation to be adjusted to accommodate different operating conditions whether due to different loads, different available pressures, different flow rates, different conditions of the flow conductor, and the like by varying the force of the spring, and by properly dimensioning the elements of the valve and the mandrel to provide desired effective orifices in the mandrel above and below its ports, which may be the same or different, when the valve is in its intermediate position.

While the piston units disclosed herein are double acting so that the units function identically in either direction in a flow conductor, alterations in the design to provide valves having different upper and lower restriction characteristic, use of different biasing spring, and other changes may render their operation different for each direction of movement. It may be desired that different functional characteristics be provided for pumping into a well and for retrieving to the surface. The piston unit may carry a load into the well and then return empty. Alternatively, a piston unit may be sent into a well alone to retrieve a load. These piston unit characteristic changes are to be considered applicable to the other units disclosed herein.

It will now be seen that a new and improved piston unit for moving tools, instruments and the like through a flow conductor has been described and illustrated.

It will be further seen that the piston unit is movable through a flow conductor responsive to a fluid pressure differential applied thereacross as by pumping fluid into the conductor behind or upstream of the unit and permitting fluid to flow from the conductor in front or downstream of the unit.

It will be further seen that the piston unit includes a radially expandable and contractable seal assembly and a valve for controlling the pressure applied to the seal assembly exerting a force thereon tending to expand it radially outwardly in accordance with the pressure differential exerted across the piston unit.

It will be additionally seen that the valve of the piston unit moves to a first position upon initial application of a pressure differential across the unit for expanding the seal assembly in direct relation to increase in displacing fluid pressure, to an intermediate or second position responsive to a further increase in the pressure to increase the fluid pressure within the seal assembly at a slower rate than increases in the pressure differential, and to a third position responsive to a still further increase in the pressure differential for reducing the force tending to expand the seal to effect contraction of the seal assembly and fluid bypass outside the assembly within a flow conductor.

A modified form of a piston unit embodying the invention shown in FIGURE 9 differs primarily from the piston unit 20 of FIGURE 2 in having a valve of different form than the valve of the piston unit 20. The same reference numerals are used in both FIGURES 9 and 2 denoting piston unit components common to both embodiments.

Referring particularly to FIGURE 9, the piston unit 130 includes a tubular mandrel 131 supporting an expandable external annular seal assembly 23 to seal between the mandrel and the inner wall of a flow conductor, such as the conductor 21 of FIGURE 1. The mandrel has a longitudinal bore 132 in which a valve 133 is disposed for controlling fluid communication between the mandrel bore and the chamber 31 of the seal assembly 23 responsive to a pressure differential across the valve.

The mandrel 131 has a lower enlarged socket portion 134 provided with lateral ports 135 opening into a locking chamber portion 140 defined between its upper end which opens into the lower end of the bore 132 and an internal annular end flange 141 to receive locking means on a tool, such as the well tool B, illustrated in FIGURE 1. The upper end of the socket portion 134 of the mandrel has an external annular downwardly and outwardly divergent shoulder surface 142 which holds the seal assembly against downward movement on the mandrel and provides a sealing surface of the lower end surface 71b of the seal assembly sleeve 71.

The mandrel has an enlarged threaded upper end portion 143 on which is threaded an upper locking socket member 144. The socket member is held against rotation on the mandrel by lock wire 53, previously described, having a bent end portion 61 disposed in an external annular recess 145 in the socket member communicating with the lateral slot 150. The socket member has a lower external annular downwardly convergent end surface 152 which limits the upward movement of the seal assembly 23 on the mandrel and provides a seal surface engageable by the upper end surface 71a of the sleeve 71 of the seal assembly. The socket member has a chamber 153 opening at its lower end into the bore of the mandrel and at its upper end of the internal annular locking flange 154 formed in the socket member. Lateral ports 155 in the socket member open into the chamber 153. The chamber 153 receives locking means, not shown, for releasably securing a tool such as the tool A, FIGURE 1, to the piston unit.

The mandrel 131 has a relatively short reduced bore portion 132a extending between upper and lower internal annular shoulders 160 and 161 which limit the longitudinal movement of the valve 133, as discussed hereinafter. Within the reduced bore portion 132a the mandrel has internal spaced annular flanges 162 and 163 positioned above and below mandrel ports 164 which connect the mandrel bore with the chamber 31 within the seal assembly 23 around the mandrel.

The valve 133 controls the fluid communication from the mandrel bore through the ports 164 into the seal assembly chamber 31 for controlling the fluid pressure communicated to the seal assembly chamber responsive to the pressure differential across the piston unit. The valve includes a spool-shaped valve member 170 disposed slidably on a longitudinal bolt 171 and biased toward one end of the bolt by a spring 172. The bolt has an enlarged end portion 173 providing an upper shoulder surface 174 which is engageable with a lower end surface 175 on a slidable spring retainer sleeve 180. The sleeve 180 is slidably disposed on the bolt between the enlarged bolt portion 173 and the valve member 170 and is provided with a flange 181 having a plurality of longitudinal ports or slots 182 allowing fluid flow past the flange through the flange within the mandrel bore. The valve member is supported on a portion 180a of the sleeve 180 extending from the flange 181 within the valve member around the bolt. The cross sectional area of the sleeve portion 180a is substantially equal to the cross sectional area of the bolt within the sleeve portion. The outer diameter of the flange is sufficiently less than the diameter of the mandrel bore to allow the sleeve to freely move within the bore. The flange 181 has a lower shoulder surface 183 engaged by the upper end of the sleeve 180 extending from the flange 181 within member 170 while the lower end of the spring engages a head 184 on the bolt so that the spring is confined on the bolt between the sleeve flange 181 and the bolt head. The bolt head is slightly smaller in diameter than the mandrel bore so that it slides freely within the bore and is provided with longitudinal, circumferentially spaced, ports or slots 185 to allow fluid flow in the mandrel bore past the bolt head. The bolt head also has a lateral slot 190 to receive a tool such as a screw driver for manipulating the bolt during assembly, disassembly, and adjustment of the valve.

Upward movement of the valve member 170 relative to the bolt is limited by a retainer 191 slidably disposed on the bolt between the valve member and a nut 192 secured on a threaded end portion 193 of the bolt which has opposite flat side faces 193a extending to shoulder surfaces 193b. The retainer has a plurality of circumferentially spaced longitudinal ports or flow passages 194 to allow fluid flow past the retainer within the mandrel bore. The retainer also has a lateral slot 195 which opens upwardly over a wide portion to receive a pair of oppositely positioned downwardly extending ears 200 on the nut 192 to hold the nut against unscrewing on the bolt and which opens downwardly the width of the threaded portion of the bolt. The end portion of the bolt having the flat side faces 193a fits through the slot 195 in the retainer 191 holding the retainer against rotation on the bolt and allowing the retainer to be placed over the end portion of the bolt and moved downwardly until it engages the shoulders 193b. The nut and retainer cooperate as a detent in the same manner as the spring retainer 113 and the nut 115 in the piston unit 20, discussed above. The lower face of the retainer is engaged by the upper end surface of the valve member 170. The outer periphery of the lower face of the retainer engages the mandrel shoulder 160 limiting the downward movement of the valve 133 as a unit within the bore of the mandrel. Similarly, the outer periphery of the upper surface of the flange 181 on the spring retainer sleeve is engageable with the mandrel shoulder 161 limiting the upward movement of the valve as a unit within the mandrel bore. The valve is loosely disposed in the mandrel bore so that it is easily moved as a unit between the position of FIGURE 9 and an upper position at which the flange 181 engages the shoulder 161.

The valve member 170 has upper and lower external annular end flanges 201 and 202, respectively, and intermediate upper and lower flanges 203 and 204, respectively, spaced from each other and from the end flanges. The outer diameters of the flanges 201–204 are slightly less than the internal diameter of the mandrel bore through its flanges 162 and 163 so that when one of the valve member flanges is positioned within one of the mandrel flanges fluid flow is substantially reduced, though not completely cut off, past the aligned flanges. By so restricting the flow in the mandrel bore the pressure within the seal assembly chamber 131 is altered as described below while maintaining minimum flow through the piston unit. The valve member flanges are longitudinally spaced to control fluid communication into the mandrel ports 164 from both the upstream and downstream portions of the mandrel bore.

The piston unit 130 functions in essentially the same manner as the piston unit 20. The unit is coupled with tools or instruments to be carried by it in the flow conductor and inserted into the conductor as generally illustrated in FIGURE 1. The outside diameter of the seal assembly relative to the flow conductor bore is sufficient to establish a seal with the bore wall when the piston unit is inserted into the flow conductor. Displacing fluid is pumped under pressure into the flow conductor above the piston unit to establish a pressure differential thereacross and force the piston unit downwardly in the conductor. The initial flow of displacing fluid together with the force of gravity shifts the valve 133 to the position shown in FIGURE 9 at which it is supported within the mandrel bore by the lower face of the retainer 191 engaged on the internal mandrel shoulder 160. The valve member flange 204 is aligned with the internal mandrel flange 163 substantially restricting the orifice of the mandrel bore below the ports 164 while the valve member flanges 201 and 203 are spaced above and below the mandrel flange 162 providing a maximum orifice in the mandrel bore between the ports 164 and the mandrel bore above the valve member. Thus, fluid from the upstream end of the piston unit flows through within the mandrel bore through the ports 194 of the retainer 191, around the end flange 201 within the mandrel bore, within the restricted portion 132a of the mandrel bore along the valve member between its flanges 201 and 203 through the mandrel internal flange 162, and past the valve member flange 203 outwardly into the lateral ports 164 from which the fluid flows into the chamber 31 of the seal assembly. The upstream displacing fluid pressure is therefore initially transmitted directly into the seal assembly expanding the assembly more tightly against the flow conductor inner wall so that an initial maximum fluid pressure differential is established from end to end across the piston unit starting the downward movement of the piston unit in the flow conductor.

The retainer 191 is supported on the mandrel shoulder 160 and the bolt 171 is supported against downward movement by the nut 192 which is supported by the retainer. The pressure differential within the mandrel bore across the valve member resulting from the restriction of the bore by the valve member flange 163 produces a downward force on the valve member and sleeve 180 biasing them against the spring 172. The lower end of the valve member engages the upper end surface of the flange 181 of the retainer sleeve 180 whose flange 181 at its lower surface 183 is supported on the upper end of the spring. The pressure differential acts over an annular area defined by the cross sectional area of the valve member around the bolt 171 through the valve member flange 204 and the cross sectional area of the sleeve portion 180a. When the pressure differential across the valve member reaches a value sufficient to compress the spring 172 the valve member and sleeve 180 are forced downwardly compressing the spring and moving the valve member downwardly relative to the bolt 172 to a position spaced below the retainer 191 which cannot move downwardly due to its engagement with the mandrel shoulder 160. As the valve member flange 201 moves downwardly relative to the mandrel flange 162, the fluid transmission into the restricted mandrel bore portion from the upstream end of the piston unit is progressively limited to a minimum as the flange 201 enters the mandrel flange 162. During the downward movement of the valve member restricting fluid transmission into the seal assembly, the actual value of the pressure within the seal assembly continues to increase though it does not increase in direct proportion to the increase in the displacing fluid pressure above the valve. The valve member and mandrel flanges are inter-related both in spacing and dimensions such that as the valve member moves downwardly in the mandrel the valve member flange 201 enters the mandrel flange 162 while the valve member flange 204 is still within the mandrel flange 163 so that the pressure within the chamber 31 is at a value less than the upstream pressure and greater than the downstream pressure.

Further displacing fluid pressure increases force the valve member farther downwardly against the resistance of the spring 172. If the pressure differential reaches a sufficiently high value the valve member is moved to its lower limit determined by the engagement of the lower end surface 175 of the sleeve 180 with the upper end surface 174 of the enlarged portion 173 on the bolt 171. As the valve member moves this additional distance downwardly relative to the bolt and mandrel, the valve member flange 201 moves farther into the mandrel flange 162 while the valve member flange 204 moves to a position spaced below the mandrel flange 163 so that the effective orifice of the mandrel bore between the ports 164 and the top end of the mandrel is restricted while the effective orifice of the mandrel bore between the ports and its bottom end is quite large so that the pressure within the seal assembly chamber is reduced to substantially the level of the downstream pressure below the piston unit. The pressure within the seal assembly is equal to the downstream pressure and less than the upstream pressure. The pressure differential between the higher upstream pressure around the seal assembly and the lower downstream pressure within the seal assembly results in radially inward forces on the sleeve 71 forcing the seal assembly segments 70 inwardly from the inner wall of the flow conductor so that a film of displacing fluid moves downwardly around the seal assembly within the flow conductor wall thereby bypassing the piston unit. The benefits of the reduction in the expanding force within the seal assembly and the bypassing of the piston unit by the displacing fluid are the same as those discussed in relation to the piston unit 20.

The piston 130 is returnable to the surface by displacing it in the opposite direction with reverse flow of the displacing fluid so that the upstream or high pressure end of the piston into which the displacing fluid is pumped is the lower end. The displacing fluid is pumped in the same manner to the piston unit with the valve 133 being lifted upwardlly as a unit by the pressure differential across the valve so that the upper face of the flange 181 on the spring retainer sleeve engages the downwardly facing mandrel shoulder 161 positioning the valve to direct upstream pressure from below the piston unit into a chamber 31 of the seal assembly while substantially isolating the seal assembly chamber from the downstream lower pressure above the unit. Upon initiation of the procedure of returning the piston unit to the surface the pumping of the displacing fluid from above the piston unit obviously is terminated so that a pressure differential across the valve in the downward direction diminishes allowing the spring 172 to return the valve member upwardly until its upper end engages the lower face of the retainer 191. Also, in the absence of a pressure differential to position the valve in some other position the gravity causes the valve to move to the position illustrated in FIGURE 9 at which it then remains until upward flow of displacing fluid in the flow conductor below the piston unit is initiated for the return of the piston unit to the surface. Therefore, the initial effect of the upward flow of the displacing fluid into the piston unit is to lift the valve upwardly until the flange 181 engages the mandrel shoulder surface 161. If the pressure differential across the piston unit is increased to a sufficient value the piston unit begins its upward travel with maximum upstream displacing fluid pressure being applied into the seal assembly chamber 31 so long as the pressure differential applied across the valve from its lower to its upper end is not of a high enough value to compress the spring 172. Under such conditions the mandrel flange 163 is between the valve member flanges 202 and 204 allowing flow into the ports 164 from below the valve while the flange 203 is within the flange 162 restricting the mandrel orifice above the ports 164.

When the pressure differential across the valve increases above a predetermined value, the valve member and the bolt 171 are lifted upwardly relative to the sleeve 180 which is held against upward movement by the flange 181 which engages the mandrel shoulder surface 161. The pressure differential across the valve acts over a cross sectional area of the bolt 171 within the valve member and over an annular area of the valve member through its flange 203. As the valve member and bolt are lifted by the force produced by the pressure differential, the spring 172 is compressed toward the flange 181 by the head 184 of the bolt. As the pressure differential increases the valve member, bolt, and related components including the nut 192 and retainer 191 are lifted with the valve member flange 203 moving upwardly within the mandrel flange 162 and the valve member flange 204 entering the mandrel flange 163 below the mandrel ports 164 so that the effective mandrel bore orifices above and below the ports 164 are restricted and the pressure within the seal assembly chamber adjusts to a value between the upstream and downstream pressures.

Further pressure differential increases across the piston unit lift the valve member and bolt against the spring to an upper end position limited by the engagement of the upper end surface 174 of the enlarged bolt portion with the lower end surface 175 of the sleeve 180. At this upper end position of the valve member and bolt, the seal assembly chamber 31 is isolated from the upstream pressure due to the presence of the valve member flange 202 within the mandrel flange 163 below the ports 164 while the valve member flange 203 is positioned above the mandrel flange 162 providing substantially unrestricted fluid communication from the low pressure downstream end of the piston unit around the valve member flange 203 and within the mandrel flange 162 along the central portion of the valve member between its flanges 203 and 204 into the seal assembly chamber 31 through the mandrel ports 164. The pressure within the seal assembly is reduced to a value substantially equal to the downstream pressure above the piston unit and the seal assembly 23 is compressed inwardly by the pressure differential between the high downstream pressure below the piston unit acting around the seal assembly and the lower upstream pressure from above the piston unit within the seal assembly forcing the seal assembly inwardly away from the flow conductor wall allowing fluid to pass upwardly within the flow conductor around the outer surfaces of the seal assembly.

During both upward and downward travel of the piston unit, the valve 133 generally does not remain at a particular position within the mandrel but rather constantly moves longitudinally regulating the pressure within the seal assembly dependent upon this resistance to movement encountered by the piston unit, tools, and other equipment carried by it. Obviously, at any time the pressure differential across the valve decreases below the value required to compress the spring 172, the spring expands returning the valve member in a downward direction to a position which increases the communication of the higher upstream pressure into the seal assembly increasing the expanding force of the seal assembly within the flow conductor.

It will now be seen that a modified form of piston unit embodying the invention includes a double acting valve with a unitary valve member having spaced external annular flanges including a pair of end flanges and a pair of intermediate flanges adapted to cooperate with internal annular mandrel flanges for controlling the fluid pressure in the chamber and causing it to be substantially equal to the supstream pressure when the pressure differential across the unit is relatively low to be of a value intermediate the upstream and downstream pressures when the pressure differential is of an intermediate value, and to be substantially equal to the downstream pressure when the pressure differential is relatively high and exceeds a predetermined high value.

FIGURE 10 illustrates a modified form of the piston unit 130 shown in FIGURE 9. The piston unit of FIGURE 10 differs from that of FIGURE 9 only with respect to its valve member which is provided with three external annular flanges and in the use of a slightly modified mandrel to accommodate the triple flange form of valve member. The components of the piston unit of FIGURE 10 which are identical to those of FIGURE 9 are referred to by the same reference numerals while the modified components are referred to by the same reference numerals with the subscript $a$ added. Referring specifically to the FIGURE 10, a piston unit 130a includes a mandrel 131a on which is supported an external annular expandable and contractable seal assembly 23 for sealing between the mandrel and the inner wall surface of a flow conductor such as illustrated in FIGURE 1. A valve 133a is supported within the bore 132a of the mandrel for longitudinal movement relative to the mandrel to control fluid communication between the bore of the mandrel and the inner chamber 31 of the seal assembly around the mandrel for expanding the seal assembly responsive to the displacing fluid pressure across the piston unit. The mandrel 131a has lateral ports 164a which are located between upper and lower internal annular mandrel flanges 162a and 163a, respectively. The ports 164a and the flanges 162a and 163a serve identical functions as the corresponding components of the piston unit 130 of FIGURE 9 differs therefrom only in the size of the ports and the longitudinal spacing of the mandrel flanges to accommodate both the ports and the flanges to the triple-flange valve member 170a. A valve member 170a supported on the sleeve portion 180a above the flange 181 has an upper external annular end flange 201a, a lower external annular end flange 202a, and a single intermediate external annular flange 205 located substantially midway between the flanges 201a and 202a. The valve member flanges cooperate with the internal mandrel flanges to control fluid communication between the seal assembly chamber 31 and the bore of the mandrel.

The operating procedures followed with the piston 130a are identical to those employed with the piston unit 130 as discussed above. In pumping the piston downwardly, gravity together with the pressure differential within the displacing fluid across the valve 133a initially shifts the valve downwardly to the position illustrated in FIGURE 10. The valve member flange 205 is aligned within the mandrel flange 163a restricting the mandrel bore below the ports 164 at the flange 164a. The upper end flange 201a of the valve member is above the mandrel flange 162a so that the mandrel bore above the ports is relatively unrestricted and the pressure in the chamber 31 is substantially equal to the upstream pressure. If the pressure differential across the piston unit increases to such degree that it forces the valve member 170a and its sleeve downwardly against the force exerted by the spring 172, as the valve member flange 201a approaches the mandrel flange 162a while the middle flange 205 is still within the mandrel flange 163a, the mandrel bore both above and below the ports 164a is restricted and the pressure in the chamber 31 is a value intermediate the upstream and downstream pressure. A further increase in the pressure differential causes further downward movement of the valve member and the sleeve until the sleeve end surface 175 engages the bolt shoulder surface 174 at which position the flange 201a is aligned within the mandrel flange 162a while the middle flange 205 of the valve member is below the mandrel flange 163a so that the mandrel bore above the ports 164a is restricted and below the ports 164a is relatively unrestricted and the pressure in the chamber is substantially equal to the downstream pressure so that the seal assembly is moved to its retracted position permitting fluid flow therepast externally of the piston unit.

The piston unit 130a is returned upwardly in the same manner as the piston unit 130. Upwardly acting pressure differential across the piston unit initially lifts its valve 133a upwardly until the sleeve flange 181 engages the mandrel shoulder 161a. The flange 202a on the valve member 170a is below the mandrel flange 163a so that the mandrel bore below the ports 164a is unrestricted and the higher upstream pressure below the piston unit is communicated through the ports 182 in the flange 181 past the valve member flange 202a along the valve member within the flange 163a and outwardly into the seal assembly chamber through the mandrel ports 164a. The mandrel bore above the ports, however, is now restricted since the middle valve member flange 205 is aligned within the mandrel flange 162a above the ports 164a.

Further increases in the pressure differential across the piston unit and the valve sufficiently great to overcome the force of the spring 172 cause upward movement of the valve member and the bolt 171. As the end flange 202a on the valve member approaches the mandrel flange 163a, the mandrel bore below the ports 164a is progressively reduced until the valve member is at a position at which the middle flange 205 is still within the upper mandrel flange 162a and the lower end flange 202a enters the flange 163a of the mandrel whereupon the mandrel bore is restricted both above and below the ports 164a and pressure in the chamber 31 is at a value intermediate the upstream and downstream pressures. Increased pressure differential across the valve then lifts the valve member and bolt farther upwardly until the bolt shoulder surface 174 engages the lower end surface 175 on the sleeve 180 at which position the valve member end flange 202a is fully within the mandrel flange 163a while the middle valve member flange 205 is above the mandrel flange 162a so that the seal assembly chamber and the mandrel bore above the ports 164a is unrestricted and below is restricted so that the pressure in the chamber 31 drops to substantially the downstream pressure and the seal assembly contracts and permits fluid flow exteriorly thereof and pass the piston unit.

The valve 133a of the piston unit 130a may move between its extreme positions during both the pumping down and pumping up procedures to serve as a regulating valve varying the force with which the seal assembly is held in or toward its expanded position in accordance with the operating conditions of the piston unit.

It will now be seen that a further modified form of piston unit embodying the invention includes a valve member having upper and lower end flanges and an intermediate flange adapted to cooperate with the internal mandrel flanges for controlling fluid communications between the mandrel bore of the valve piston unit and the expansion chamber of the seal assembly of the unit.

A further form of piston unit 230 embodying the invention is illustrated in FIGURES 11–15. The piston unit 230 is similar in structure and function to the piston unit 130 of FIGURE 9. The piston 230 includes a mandrel 231 having a longitudinal bore 232 of substantially uniform diameter in which a valve 233 is loosely disposed for longitudinal movement relative to the mandrel to control fluid communication between the bore of the mandrel and the chamber 31 of a seal assembly 23 on the mandrel through lateral mandrel ports 234.

The mandrel has a lower enlarged portion 235 and a lower locking socket end portion 240 provided with an internal locking chamber 241 opening upwardly into the lower end of the mandrel bore and downwardly through an internal locking flange 242. The locking chamber 241 receives locking means on apparatus such as well tools and instruments coupled with the lower end of the piston unit. The locking socket portion 240 has a lateral port 243 to aid in fluid flow through the unit when coupled with tools or instruments and the like. The lower socket portion of the mandrel has an upper external annular shoulder surface 244 which limits downward movement of the seal assembly 23 on the mandrel.

The mandrel has an upper externally threaded enlarged end portion 245. The wall thickness of the mandrel portions 235 and 245 is sufficiently greater than the wall thickness of the mandrel portion between such end portions that when the seal assembly 23 is supported on the mandrel as shown in FIGURE 11 the chamber 31 is defined between the seal assembly sleeve 71 and the mandrel. An upper socket member 250 is threaded on the mandrel end portion 245 and held against rotation on the mandrel by a locking wire 53 having an end portion 61 extending through a lateral slot 251 in the socket into an external recess 252 in the mandrel. The locking wire is received in an external annular recess 253 of the socket member. The upper socket member has a locking chamber 254 opening downwardly into the upper end of the mandrel bore and upwardly through an internal annular locking flange 255. The socket member is provided with lateral ports 260 to aid communication into the upper end of the piston unit when tools, instruments or the like are coupled with the unit. The locking chamber 254 receives locking means on such tools or instruments.

An internal annular valve seat 265 is secured in the mandrel bore extending above and below the ports 234. The valve seat has a central portion 266 having a bore 267 and enlarged opposite end portions 268 each of which has an outside diameter which permits the valve seat to be inserted into position in the bore 232 of the mandrel. The valve seat has lateral ports 269 positioned generally to correspond with the mandrel ports 234. The valve seat is initially secured to the mandrel by tack welds at the locations 270 along end edge surfaces of the mandrel ports 234 and outer surface portions of the end portions 268 of the valve seat. Each of the end portions 268 of the valve seat has an external annular groove 275 which is filled with a solder or weld material metal prior to insertion of the valve seat into the mandrel bore. After the valve seat is in position, the mandrel and valve seat are heated by suitable means, such as induction heating, melting and metal in the grooves 275 further securing the valve seat within the mandrel and establishing a seal between the valve seat end portions and the bore wall of the mandrel above and below the mandrel ports 234.

The valve 233 includes an internal central valve member 276 and identical integral upper and lower end stems 274. The central valve member 276 has opposite end flanges 277 and 278 and intermediate flanges 279 and 280 equally spaced along the length of the valve member. The valve member is slidable within the bore 267 of the valve seat for selectively restricting the bore above and below the valve seat ports 269 for controlling fluid communication from the mandrel bore through the valve seat and mandrel ports into the seal assembly chamber responsive to pressure differentials applied across the valve. The valve member flanges are smaller than the bore through the valve seat so that a predetermined minimum flow may occur through the valve at all times as discussed in connection with the previously described embodiments of the invention.

Each of the valve stems 274 has a reduced round portion 285 and a square portion defined by one pair of opposite flat surfaces 286a extending to the free end of the stem and another pair of flat surfaces 286b extending to oppositely positioned lugs 287 formed on the stem. Each lug 287 has a shoulder surface 288 facing the adjacent flat surface 286b. The curved surfaces of the lugs are coincident with the cylindrical surface of the major round portion 277a of the stem. Each stem has a beveled end surface 289 and an end screw driver slot 290.

The valve 233 includes substantially identical components above and below the valve member 276. An upper valve spring 295 is positioned on the upper valve stem 274 to resist downward movement of the valve member. The spring is disposed along a lower end portion over an inner sleeve member 296 including a sleeve 298 slidable on the stem and engageable at its lower end with the flange 277. The sleeve has radial fingers 299 which support the lower end of the spring and engage the upper end of the valve seat 265 limiting the downward movement of the valve 233 as a unit in the mandrel bore. The spring 295 extends upwardly over an outer sleeve member 297 having a sleeve 305 slidable on the stem and radial fingers 306 which are engaged by the upper end of the spring and slide along the mandrel bore wall to aid in guiding the valve as it moves in the mandrel. Fluid flows in the mandrel bore around the fingers on both the inner sleeve and members.

The sleeve 305 has a pair of internal oppositely positioned lugs 307 providing substantially parallel flat inside surfaces 308 which are spaced slightly farther apart within the sleeve than the valve stem flat valve surfaces 286a and 286b so that the sleeve and spring retainer slides freely onto the valve stem in assembly of the valve. The coaction between the lugs 307 with the surface features of the end portion of the valve stem permit the sleeve and spring retainer to be releasably locked on the valve stem against the force of the compressed spring 295. After the member 296 is placed on the valve stem the spring 295 is positioned over the stem with its lower end supported on the fingers 299. The sleeve and spring retainer 297 is then telescoped over the valve stem into the spring with the lug surfaces 308 aligned with the flat stem surfaces 286a. The sleeve member is pressed over the stem until the lugs 307 are aligned with the reduced round portion 285 of the stem which allows the sleeve member to be rotated on the stem. The sleeve member is rotated 90 degrees on the stem aligning the lug surfaces 308 with the flat stem surfaces 286b. The sleeve member is then released with the spring 295 forcing it toward the stem end until the lugs 307 in the sleeve engage the shoulder surfaces 288 on the valve stem. The lugs are thus disposed along the flat opposite stem surfaces 286b so that the sleeve member is not rotatable on the stem while the shoulder surfaces 288 engaging the lugs 307 hold the sleeve member on the stem. Similarly, the sleeve is readily removed from the stem by forcing it against the spring until the lugs 307 are aligned with the round stem portion 285. The sleeve is then rotated 90 degrees to align the lug surfaces 308 with the stem flat surfaces 286a. The sleeve member is then removed by withdrawing it from the stem with the lug surfaces 308 sliding along the stem flat surfaces 286a.

The lower portion of the valve 233 is substantially identical to the upper portion of the valve below the valve member flange 278 and includes an inner sleeve member 296, a spring 295, and a modified sleeve member 304a which is identical to the sleeve member 297 in all respects except that it has an external annular end flange 306a instead of the radial fingers 306. The flange 306a serves as a retainer to hold the spring 295 on the lower stem 274 and valve member and is sufficiently smaller in diameter than the wall of the bore 232 through the mandrel that the fluid flowing through the mandrel bore flows around the flange within the mandrel bore.

The piston unit 230 functions in substantially the same manner as the previously described units for propelling tools, instruments, and the like coupled thereto through a flow conductor. The piston unit with such tools and instruments carried by it are inserted into a flow conductor. Displacing fluid is pumped into the upper end of the piston unit with the valve 233 being initially moved by gravity and the flow of the displacing fluid to the position illustrated in FIGURE 11. The valve, which is loosely disposed in the mandrel bore, is movable to the position illustrated at which it is supported by the engagement of the fingers 299 on the upper end of the sleeve member 265. The displacing fluid flows downwardly in the mandrel bore 233 past the fingers 306, around the upper valve stem, sleeve members 296 and 304, and the spring 295, past the fingers 299, and into the sleeve valve seat 265. The fluid flows downwardly within the seat around the valve member flange 277 and outwardly through the seat ports 269 and the mandrel ports 234 into the chamber 31 of the seal assembly 23. The valve member flange 280 is below the valve seat ports within the valve seat bore restricting communication from the mandrel bore below the flange 280 into the seal assembly chamber to a minimum so that the seal assembly is initially forced outwardly by the higher upstream pressure.

The pressure differential across the valve member produces a downward force on the valve which at a predetermined value moves the valve member and integral upper and lower valve stems downwardly while the lower end of the upper spring 295 is held against downward movement by the fingers 299 on the sleeve member 296. The downward movement of the upper stem compresses the spring 295 while the lower spring 295 moves downwardly with the lower valve stem without compressing. As the valve member flanges move downwardly in the valve seat, the upper flange 277 enters the bore 267 of the valve seat while the flange 280 is still within the bore so that communication into the valve seat ports 269 is restricted from both above and below the valve member so that the pressure within the chamber 31 is adjusted to a value between upstream and downstream values. The relative force expanding the seal assembly may be reduced as compared with the force expanding the assembly when it is in maximum communication with the upstream fluid pressure. Further increases in the pressure differential across the valve 233 forces the valve rod downwardly until the lower end surface of the sleeve 305 engages the upper end surface of the sleeve 298 on the upper stem. The lower valve member flange 280 moves downwardly out of the valve seat bore while the upper valve member flange 277 moves farther into the bore above the valve seat ports 269 establishing the maximum restriction in the mandrel bore above the ports while establishing maximum fluid communication of the downstream pressure into the seal assembly by effectively enlarging the restriction in the bore below the ports. The higher upstream pressure of the displacing fluid around the seal assembly within the flow conductor bore biases the seal assembly inwardly away from the inner wall of the flow conductor effecting maximum deflation of the seal assembly.

When there is a reduction in the pressure differential across the valve the upper spring 295 expands lifting the sleeve member 304 while its lugs 307 engage the shoulder surfaces 288 on the upper end portion of the upper valve stem lifting the valve stem returning the valve member 276 upwardly within the seat proportional to the decrease in the pressure differential across the valve. Generally, the valve will serve as a regulator controlling the pressure within the seal assembly in accordance with the operating conditions encountered by the piston unit.

The return of the piston unit upwardly in the flow conductor is effected by reversal of the flow direction of the displacing fluid within the conductor which initially applies a pressure differential across the valve with the higher pressure being below the valve so that it is lifted upwardly until the fingers 299 on the lower sleeve member 296 engage the lower end surface of the valve seat. At this position of the valve, the lower end flange 278 of the valve member is positioned below the lower end of the bore 267 through the valve seat while the valve member flange 279 is within the valve seat bore above its ports 269 so that fluid communication into the lateral valve seat ports is restricted to a minimum from above the valve member flange 279 while being a maximum from below the valve member. As the pressure differential across the valve increases the valve member is lifted upwardly compressing the lower valve spring 295 moving the flange 278 into the bore of the valve seat while the valve member flange 279 remains within such bore above the valve seat ports 269 to provide maximum restrictions in communication into the seal assembly chamber from both upstream and downstream pressure so that the pressure in the seal assembly chamber is changed to a value between upstream and downstream pressure which may reduce the inflation of the seal assembly, or, if inflation occurs, it will not occur at as great a rate as the increase in pressure differential across the piston unit elements.

Further increases in the pressure differential across the piston unit lifts the valve member compressing the lower valve spring 295 farther moving the valve member upwardly until the upper end surface of the lower sleeve member 304a engages the lower end surface of the lower sleeve member 296. The valve member flange 278 is within the bore of the valve seat member while the flange 279 is above the upper end of the valve seat bore so that communication into the chamber of the seal assembly is restricted to a minimum from the higher upstream displacing fluid pressure and is at a maximum with the lower downstream pressure. The seal assembly is deflated which will allow displacing fluid to bypass the piston unit around its seal assembly within the flow conductor and reduces the friction between the piston unit and the flow conductor wall.

As described above, the piston unit 230 has identical operating characteristics both upwardly and downwardly. The unit may, however, be modified to render it essentially operative in only one direction by altering the sleeve 296 at the end of the unit opposite to the direction in which the unit is to be inoperative. The fingers 299 are reduced in length so that the free travel of the valve allows the fingers to move into the valve seat end portion 268. This additional free travel equals the full normal valve travel at maximum pressure differential so that an initial application of pressure at the modified end of the valve immediately moves the valve downstream to its end position providing maximum communication of downstream pressure into the chamber 31 so the higher upstream pressure forces the seal assembly inwardly rendering the piston unit essentially incapable of sustaining a pressure differential. However, the piston unit retains its capability to operate in the other direction so that a higher pressure applied to the unmodified end of the valve develops a pressure differential across the unit in the normal manner as discussed above.

It will now be seen that a further form of piston unit embodying the invention includes a unitary valve structure comprising a central, multi-flanged valve member formed integral with oppositely extending coaxial valve stems each supporting a valve spring for controlling the operating characteristic of the valve.

A still further form of a piston unit embodying the invention is used for inserting a flexible pipe into a tubing string in a well bore in a system as illustrated schematically in FIGURE 17. A well head 330 is secured on a string of well casing 331. A tubing string 332 is supported within the casing from the well head in any suitable manner. A master valve 333 is secured on the well head connected with the tubing string. A flow T 335 is connected with the master valve and a conduit 340 including a valve 341. A suitable stuffing box 342 is secured on the flow T for insertion and removal of a string of flexible pipe 343 under pressure. The flexible pipe is transported within the tubing string 332 by a piston unit 344 embodying the invention. The flexible pipe 343 is stored at the surface coiled on a suitable reel 345 connected with a flow conduit 350 having a valve 351 to permit fluid flow into or out of the flexible pipe 343 during insertion and removal of the pipe and while it is in the tubing string 332 of the well.

Referring particularly to FIGURE 18 the piston unit 344 comprises identical upper and lower valve annular units 345 which are each clamped around the flexible pipe 343 in longitudinal spaced relationship supporting a seal assembly 23 therebetween as previously described. The annular space around the tubing 343 in the sleeve 71 of the seal assembly forms a common inflation chamber 350 for the seal assembly and a central portion of an annular flow passage 351 extending throughout the length of the piston unit around the pipe 343. The valve units 345 function to progressively decrease the inflation of the seal assembly 23 as the pressure differential across the piston unit in the displacing fluid is increased. Each of the valve units includes structure defining a variable restriction in the annular flow passage 351 through the piston unit operable responsive to the pressure differential across the valve unit. For example, during the transporting of the flexible pipe 343 downwardly in the tubing string 332 by the piston unit displacing fluid is pumped through the conduit 340, the flow T 335, and the master valve 333 into the tubing string annulus 332a around the flexible pipe to the piston unit 344. The displacing fluid flows through the piston unit 344 around the pipe 343 within the annular flow passage 351 which extends through both the upper and lower valve units 345 and the chamber 350 of the seal assembly. The valve units 345 each provide restrictions in the flow passage 351 which are variable as the flow rate and thus pressure differential across the valve units increases. When pumping the piston unit downwardly in the tubing string, the lower valve unit 345 is first actuated reducing its restriction to flow through it and thereby reducing the differential between the seal assembly chamber and the downstream pressure below the piston unit reducing the force inflating the seal assembly so that the frictional drag of the seal assembly is reduced and some fluid may bypass the seal assembly. Further increases in the pressure of the displacing fluid above the piston unit actuate the upper valve unit 345 causing it to restrict downwardly through the seal assembly and lower valve unit as the upstream fluid pressure increases so that the expanding force in the seal assembly may be further decreased relative to the pressure of the displacing fluid within the tubing string around the sealing assembly further decreasing the drag of the seal assembly along the inner wall of the tubing string 332 and perhaps allowing additional fluid bypass downwardly around the seal assembly within the tubing string.

As in the case of the other piston units illustrated and described herein the piston unit 344 is double acting so that it functions in either direction in the same manner. When displacing fluid forces the piston unit upwardly the upper valve unit 345 first is actuated reducing the restriction it provides to decrease the expanding force of the seal assembly or, stated otherwise, to increase the pressure differential across the seal assembly from outside upstream to inside so that the expanding force of the seal assembly is reduced. Further increases in the pumping rate of the displacing fluid upwardly below the piston unit actuates the lower valve units 345 causing it to close somewhat diverting the displacing fluid around the valve unit and seal assembly 23 to still further increase the pressure differential across the seal assembly from outside upstream to inside forcing contraction of the seal assembly to reduce its drag along the tubing string wall and perhaps allow a film of displacing fluid to bypass the seal assembly in the same manner as when pumping the piston unit downwardly in the tubing string.

Each of the valve units 345 includes a split clamp ring comprising identical half-sections 352 each of which has an inner axial recess defined by substantially flat surfaces 353 connected by a curved surface 354. The surfaces 353 are in planes substantially 90 degrees to each other so that when the clamp ring portions are placed on opposite sides of the flexible pipe 343 the space defined between the clamp ring halves by the surfaces 353 and 354 is substantially square in cross section having generally curved corner edges defined by the surface 354, FIGURES 19 and 20. The clamp ring halves each have an outer spherical surface portion 355 providing a ball and socket arrangement in the assembly of the valve unit on the flexible pipe to allow some bending of the pipe as the clamp ring halves accommodate themselves to the contour of the pipe. The clamp ring halves have substantially flat upper end and lower end surfaces 360 and inner edge surfaces 361 which are in substantially parallel spaced relation to each other when secured on the flexible pipe, FIGURE 19.

Preparatory to assembly of each of the valve unit on the flexible pipe the pipe is formed as by forging with a die into a square cross section at the location of each clamp ring for each valve unit along a length of the pipe as measured between the end faces 360 of the ring halves 352. Forming the squared portions of the pipe produces stop shoulders 343a at opposite ends of each square portion to aid in holding each valve unit against moving on the pipe as it is clamped to the pipe. The clamp ring halves are secured on the flexible pipe by a tubular socket member 362 and a tubular gland 363 threaded into an outward end portion of the socket member. The socket member has an intermediate internal conical surface portion 364 which engages the spherical surface portions 355 of the clamp ring halves. The socket member has a reduced end portion 365 which fits telescopically the seal assembly 23 to support one end of the seal assembly on the flexible pipe. The socket member also has an external downwardly and inwardly convergent shoulder surface 370 which engages the upper end edge surfaces of the seal assembly sleeve 71 and end ring 72 for holding seal assembly against upward movement and providing a sealing surface for coacting with the upper end of the sleeve.

The gland member 363 has a reduced externally threaded lower end portion 371 threaded into an internally threaded upper end portion 372 of the socket member. An external downwardly facing shoulder surface 373 on the gland member limits the extent to which the member may be threaded into the socket member. The gland member has a lower internal spherical surface portion 374 which engages the spherical outer surface portion 355 on the clamp ring halves to cooperate with the socket member surface 364 for holding the clamp ring halves on the flexible pipe. The gland member has a bore 375 extending from the conical surface 374 to an internal shoulder surface 380 provided on an internal annular end flange 381. The inner surface 382 of the flange 381 is coaxial with and spaced apart from the flexible pipe and together with the flexible pipe outer surface defines an end portion of the annular flow passage 351 of the piston unit.

A pair of identical half-sleeve valves 383 are disposed within the gland member 363 biased by valve spring 384 toward the end flange 381 of the gland member away from the clamp ring halves of the valve unit. A valve ring 385 is disposed in coaxial relationship around the flexible pipe and sleeve valve halves within the gland member biased toward the clamp ring by the spring 384. The sleeve valves 383 each has an end flange portion 390 providing a shoulder surface 391, and an intermediate half-cylindrical portion 392 having an outer surface of reduced outside diameter. A pair of spaced axially extending fingers 393 are formed on the intermediate portion 392, each comprising a base portion 393a and a narrower end portion 393b. There is a slight inwardly offset relationship between a major portion of each of the fingers and the intermediate portion 132 of each of the sleeve valves providing an inner shoulder surface 394 and an outer shoulder surface 395 on each of the fingers. The shoulder surface 395 is longitudinally spaced on each finger toward the free end of the finger from the inside shoulder 394 on the finger. The circumferential spacing of the fingers defines a slot or recess 400 opening toward the free end of the fingers in each of the valve sleeves.

The valves 383 are disposed around the flexible pipe within the gland 363 longitudinally aligned with each other and laterally spaced as best seen in FIGURES 22 and 26. Adjacent finger portions 393b extend between adjacent edge surfaces 361 of the clamp ring halves. Under static conditions various components of each of the valve units are positioned as illustrated in FIGURE 18. The spring 384 is confined between the shoulder surface 391 on the sleeve valves 383 and the valve ring 385. The end surface 390a of the sleeve valves is biased against the internal shoulder surface 380 of the gland 363 while the other end of the spring engages the valve ring 385 biasing it against the surfaces 360 of the clamp ring halves. The finger portions 393b are disposed between the adjacent facing edge surfaces 361 of the clamp ring halves within the valve ring 385. The valve ring is spaced from the finger shoulders 395 and the face of the ring engaged by the spring is aligned approximately with the end edge surfaces 393c on the fingers.

The valve ring is movable on the sleeve valve fingers away from their free ends compressing the valve spring 384, FIGURE 25, until the ring engages the flanges 395 on the fingers to increase flow through the valve unit. Similarly, the sleeve valve halves are movable against the spring 384 away from the gland shoulder surface 380 toward the clamp ring halves 352 until the finger shoulder surfaces 395 engage the valve ring 385, FIGURE 24, decreasing flow through the valve unit. The movement of the valve ring relative to the clamp ring halves and the movement of the sleeve valve halves provides the two valve functions of the valve units 354 discussed in detail below.

Preparatory to assembly of the piston unit 344 on the flexible pipe, its components other than the clamp ring halves and the valve sleeve halves are placed over the free end of the flexible pipe. The seal assembly 23 is placed between two sets of components for forming each of the valve units 345. One of the valve units is then assembled in clamped relation on the pipe by first placing a pair of clamp ring halves around one of the squared sections of the pipe and the socket member 362 moved over the clamp ring halves until its inner conical surface 364 engages the outer spherical surfaces 355 of the clamp ring halves to hold them in position on the pipe between the shoulder 343a. A pair of sleeve valve halves 383 are placed around the pipe with their fingers facing the threaded open end of the socket member. The valve spring 384 is then moved over the sleeve valve halves followed by the valve ring 385. The valve ring, spring, and valve sleeve halves are introduced into the socket member with adjacent finger portions 393b of the valve sleeve halves being inserted between the edge surfaces 361 of the clamp ring halves as shown in FIGURES 19, 20 and 22. The gland 363 then is positioned over the valve sleeve halves, spring, and valve ring and screwed into the threaded end portion 372 of the socket member with the gland conical surface 374 engaging the conical surfaces 355 of the clamp ring halves so that they are forced farther into the socket member and toward each other gripping the squared section of the flexible pipe tightly to lock the valve unit on the pipe. One end of the seal assembly 23 is positioned over the reduced end portion 365 of the socket member of the secured valve unit with the end surfaces of the sleeve 71 and end ring 72 of the seal assembly being moved into engagement with the shoulder surface 370 on the socket member. The other valve unit is then assembled in a similar manner as the first valve unit with the end portion 365 of the socket member being inserted into the other end of the seal assembly followed by the assembly and securing of the second valve unit on the flexible pipe so that the seal assembly is supported as shown in FIGURE 18 between the two valve units.

When the well system used in inserting the flexible pipe 343 includes the stuffing box 342, FIGURE 17, the stuffing box 342 removed from the flow T 335 and the flexible pipe is inserted through the stuffing box before the assembly of the piston unit on the free end of the pipe. The piston unit and pipe end portion are pulled into the stuffing box sufficiently for the stuffing box to be secured on the flow T with the master valve 333 closed. The master valve is opened and the flexible pipe is pushed downwardly through the flow T and master valve into the tubing string 332. Displacing fluid is pumped into the tubing string through the conduit 340 above the piston unit to force the piston unit with the flexible pipe downwardly in the tubing string. If desired, a suitable conventional lubricator may be employed in lieu of the stuffing box to facilitate the insertion of the flexible pipe with the piston unit secured thereon into the well. Such a lubricator includes a flow conduit having spaced valve assemblies which allow the flexible pipe and the piston unit to be inserted therethrough while a portion of the lubricator remains secured on the flow T 335. As in the case of the previously described piston units, the seal assembly 23 is of sufficient diameter that when inserted into the tubing string 332 an initial seal is effected between the inner wall surface of the tubing string and the outer surfaces of the elements 70 of the seal assembly.

Displacing fluid forcing the piston unit downwardly in the tubing string is pumped through the flow T and master valve around the flexible pipe 343 into the annular space 332a within the tubing string above the piston unit. The displacing fluid flows downwardly into the annular flow passage 351 around the flexible pipe through the piston unit. Initially, under static conditions and until the flow rate of the displacing fluid reaches a predetermined value, the sleeve valve halves and the valve ring of each of the valve units 345 are held at a maximum distance apart biased in opposite directions by the spring 384 with the end surfaces 390a of the sleeve valve halves engaging the internal shoulder surface 380 of the gland 363 and while the valve ring 385 is held against the end surfaces 360 of the clamp ring halves. The displacing fluid flows downwardly through the gland 363 of the upper valve unit around the flexible pipe within the portions 392 of the sleeve valve halves and within the gap between the valve seat halves defined by their adjacent edge surfaces 392b. The fluid flowing between the adjacent edges of the sleeve valve halves passes radially outwardly into the space occupied by the spring 384 around the sleeve valve halves within the gland. Thus, the entire space within the gland around the flexible pipe occupied by the valve spring and the sleeve valve halves is filled with the displacing fluid. The fluid is, of course, also free to flow inwardly and outwardly toward the valve ring through the recesses 400 between the fingers since the valve ring is positioned a substantial distance toward the clamp ring halves from the edge surface 400a of the slot 400 in each of the sleeve valve halves.

While the space within the gland 363 and the socket member 362 is fluid filled around the clamp ring halves, the valve ring, the valve spring, and the sleeve valve halves the displacing fluid does not flow downwardly from such space around the split ring halves since the spherical surface portions 355 of the split ring halves are wedged tightly against the inner conical surface 364 of the socket member. Downward flow past the split ring halves is therefore limited to the longitudinally extending spaces 361a along opposite sides of the square portion of the flexible pipe defined between adjacent edges 361 of the split ring halves within the socket member confining the split ring halves on the flexible pipe. The spaces 361a on either side of the pipe are each partially occupied by a pair of finger portions 393b disposed therein. Also, the displacing fluid gains entry into the spaces 361 only by flowing around and within the segment of the ring 385 extending across such space at the end surfaces 360 of the split ring. Thus, the restricted area of the space 361a through which the displacing fluid flows downwardly in the upper valve unit is the cross sectional area of the space 361a reduced by the combined cross sectional areas of the pair of finger portions 393b in the space and of the segment of the ring 385 extending across the space, FIG- URE 20. This restricted area through which the displacing fluid flows downwardly in the upper valve unit constitutes the most limited cross sectional area in both of the upper and lower valve units through which the displacing fluid must flow in traversing the full length of the flow passage 351 to pass through the piston unit. The fluid leaves the space 361a, flows downwardly within the reduced portion 365 of the socket member, and enters and passes through the annular chamber 350 of the seal assembly 23. The fluid urges the flexible sleeve 71 outwardly with a force determined by the differentials between the pressure of the fluid within the seal assembly and the upstream and downstream pressures above and below the seal assembly within the tubing string above and below the line of sealing engagement of the seal assembly with the inner wall of the tubing string.

The displacing fluid continues downward flow passing through the reduced end portion 365 of the lower valve unit 365 into the spaces 361a between the adjacent edge surfaces 361 of the clamp ring halves on each side of the flexible pipe. The fluid flows downwardly from the spaces 361a through the restricted opening defined by the cross sections of the spaces 361a reduced by the combined cross section of the finger portions 393b and the segment of the valve ring 385 extending over the area. This restricted area is of the same value as that described in the upper valve unit. The fluid then passes downwardly within the gland 363 around the spring 384 flowing between the edge surfaces 392b of the sleeve valve halves and inwardly in the recesses 400 of each of the sleeve halves into the space around the flexible pipe within the sleeve valve halves from which the fluid flows through the flange 381 around the flexible pipe exiting from the piston unit back into the tubing string 332 below the flexible pipe and piston unit. The fluid enters the space lower end of the flexible pipe returning upwardly through the flexible pipe and outwardly from the system through conduit 350 and valve 351 connected with the reel assembly 345.

So long as the flow rate of the downwardly flowing displacing fluid through the upper and lower valve units remains at a level at which the pressure drop through the described restricted openings of each of the valve units remains below a predetermined level, the fluid flows without effecting movement of any of the components of either of the valve units. During the pumping of the piston unit downwardly both the upper and lower valve units function to alter the pressure differential across the seal assembly 23.

In the upper valve unit 345 the valve ring 385 is held against downward movement since it rests on the upper end surfaces 360 of the clamp ring halves so that only the sleeve valve halves 383 are free to move downwardly against the force of the spring 384 to alter the restricted area available for fluid flow between the clamp ring halves. This downward movement of the sleeve valve halves is caused by the pressure drop within the spaces between the clamp ring halves applied across the cross sectional area of the finger portions 393b of the valve sleeve halves disposed between the clamp ring halves when such pressure differential is sufficient to overcome the upward force of the spring 384.

The lower valve unit, though identical to the upper valve unit, is oriented in a direction opposite to that of the upper valve unit and thus the sleeve valve halves are not free to move downwardly since their end surfaces 390a are supported against downward movement by the internal shoulder surface 380 of the gland 363. In the lower valve unit, however, the valve ring 385 is free to move downwardly against its spring 384 to a spaced position below the lower end faces 360 of the clamp ring halves until the valve ring engages the shoulder surfaces 395 on the sleeve valve fingers. The force moving the valve ring down is produced by the effect of the pressure drop across the valve ring over the area of the segment of the ring spanning the space 361a on the opposite sides of the flexible pipe.

Initially, the restricted cross sectional areas in each of the valve units at the end of its clamp ring halves through which the displacing fluid must flow are identical, and thus the pressure drop is substantially the same across such restricted areas of both the upper and lower valve units.

The area of the segment of the valve ring 385 exposed to fluid flow and spanning the spaces 361a between the clamp ring halves is greater than the combined cross sectional area of the finger portions 393b disposed within such spaces. Since only the valve ring 385 of the lower valve unit is free to move downwardly and only the sleeve valve halves of the upper valve unit are free to move downwardly, as the flow rate of the displacing fluid flowing downwardly through the piston unit increases the valve ring 385 of the lower valve unit is first forced downwardly due to the pressure drop across its segments spanning the spaces 361a compressing the spring 384 of the lower valve unit, FIGURES 25 and 26. With the lower valve ring displaced downwardly from the lower end surfaces 360 of the lower clamp ring halves the valve ring is removed from across the spaces 361a so that the fluid exits downwardly from the spaces 361a within and around the valve ring and also laterally along and between the lower faces 360 of the clamp ring halves and the upper face of the valve ring adjacent to the clamp ring, FIGURE 26. The additional lateral flow between the clamp ring lower face and upper valve ring face spreads along the valve ring and flows downwardly into the sleeve valve halves both around and within the entire valve ring. Effectively the restricted cross sectional area between the clamp ring halves is enlarged by removal of the ring segments to substantially that illustrated in FIGURE 19 which is the cross sectional area of the spaces 361a reduced only by the cross sectional areas of the pair of finger portions 393b disposed in the spaces. The valve ring is free to move downwardly, and if the pressure differential is sufficient, it moves downwardly until its lower face engages the shoulder surfaces 395 on the finger portions 393a of the lower valve unit.

The effective enlargement of the flow restriction through the lower valve unit reduces the pressure differential between the fluid flow through the flow passage portions 350 within the seal assembly and the downstream pressure in the space around and below the seal assembly in the tubing string 332. The decrease in the pressure differential across the seal assembly reduces the force urging it outwardly against the inner wall surface of the tubing string thus reducing the frictional drag between the seal assembly and the tubing string wall with increased pumping of the displacing fluid into the upper end of the piston unit.

Further increases in the pumping of the displacing of fluid downwardly into the piston actuates the upper valve unit further restricting flow through it and reducing the pressure differenial across the seal assembly. The force urging the seal assembly outwardly is further reduced. The pressure differential in the downwardly flowing displacing fluid across the restricted cross sectional area where the fluid flows along the finger portions 393a and past the valve ring into the spaces 361a between the clamp ring halves of the upper valve unit results in forcing the sleeve valve halves downwardly with a force determined by the pressure differential applied across the combined cross sectional areas of the finger portions 393d disposed between the clamp ring halves. The sleeve valve halves are forced downwardly compressing the spring 384 until the external shoulder surfaces 395 on each of their fingers engage the upper face of the valve ring 385, FIGURE 24, to further restrict the available cross sectional area through which the downwardly flowing displacing fluid enters the spaces 361a between the clamp ring halves. Prior to the downward movement of the sleeve valve halves fluid flowing to the spaces 361a was free to move along the outer surfaces of the finger portions 395a and inwardly past the shoulder surfaces 395 through the valve ring into the spaces 361a. When the finger shoulder surfaces 395 engage the upper valve ring face fluid may no longer flow along the outside surfaces of the finger portions 393a into the valve ring. Each of the cross sectional areas of the upper valve unit at the upper face of the valve ring available for downward fluid flow its reduced by a value determined by the circumferential distance along each finger shoulder surface 395 and the radial distance between the outside surfaces of the finger portions 393a and the inside surfaces of the valve ring through which fluid flows to enter the spaces 361a before the sleeve valve halves move downwardly. With the reduced cross sectional area for flow downwardly in the upper valve unit, the pressure differential across the upper valve unit is increased with the net effect of a further reduction in the force expanding the seal assembly 23 outwardly so that the frictional force between the seal assembly and the inner wall of the tubing string is further reduced. The seal assembly may be forced inwardly sufficiently to permit a thin film of displacing fluid to bypass downwardly around the seal assembly within the tubing string wall, as in the case of the previously described piston unit. The additional restriction in flow in the upper valve unit allows the upstream pressure above the seal assembly to increase at a greater rate than the pressure within the chamber 350 reducing the pressure differential across the seal assembly with respect to downstream pressure and increasing the pressure differential across the seal assembly with respect to the upstream pressure.

Thus, during the pumping of displacing fluid downwardly through the piston unit 344, the lower valve unit first opens to effect an initial reduction in the pressure differential across the seal assembly 23 and then the upper valve unit partially closes with the net effect of a still further reduction in the force causing expansion of the seal assembly 23 within the tubing string. Of course, both the valve units will function constantly dependent upon the operating conditions serving to constantly regulate the expanding force of the seal assembly in accordance with continually changing conditions.

In a system as illustrated in FIGURE 17 the piston unit 344 is most effective during the insertion of the flexible pipe 343 into the well as the piston unit is pulling the pipe downwardly at its lower end. Pushing the pipe back out of the well solely with the force of the piston unit is not, however, a practical procedure as the flexibility of the pipe prohibits compressive forces on its lower end of a magnitude sufficient to push the pipe out of the well. The flexible pipe, therefore, is removed from the well by applying a lifting force to the pipe above the stuffing box by any suitable means. For example, if the reel assembly 345 is located above the stuffing box, the flexible pipe may be removed by rotation of the reel. Conventional lifting devices employed in drilling and work-over rigs used on wells may be employed with assistance from the piston unit. The piston unit 344 is double acting in a sense that its valve units 344 are identical and the unit may thus be pumped in either direction through a flow conductor. The piston unit is pumped upwardly in the system of FIGURE 17 by establishing fluid flow downwardly within the flexible pipe 343 and back upwardly around the pipe within the annulus 332a with the conduit 340 serving as a return line for the displacing fluid. The fluid flows upwardly through the annular flow passage 351 of the piston unit. During upward flow of the displacing fluid the upper valve unit functions first when its valve ring 385 is lifted upwardly from the upper end surfaces 360 of its clamp ring halves lowering the pressure differential across the seal assembly 23 so that the expanding force of the seal assembly is reduced. Further increases in the displacing fluid flow partially close the lower valve unit by forcing its sleeve valve halves upwardly inserting the finger portions 393b further into the clamp ring halves until the finger shoulder surfaces 395 engage the lower face of the valve ring 385 further restricting the flow passage through the lower valve unit to additionally reduce the expanding force of the seal assembly 23.

While only one of the piston units 344 has been shown on the flexible pipe it will be understood that several such units may be secured on the pipe in longitudinally spaced relation when it is desired to increase the force on the pipe without overloading any one of the piston units. Since the piston unit permits constant displacing fluid flow through it, when several units are secured on the flexible pipe a pressure differential is developed across each unit so that the several units share the load in pulling the pipe into a well.

The piston unit 344 may be used, in addition to such applications as the system of FIGURE 17, to pump a determinate length of flexible tubing completely into a tubing string of a well equipped with two tubing strings. In such an application, the lower end of the flexible tubing extends below the end of a tubing string for sand washing operations while the upper end of the flexible tubing is downhole in the tubing string as distinguished from the tubing 343 of FIGURE 17 which has an upper end remaining on the reel 345 at the surface.

The flexible tubing may or may not be provided with slips, lock mandrel assemblies, locator assemblies, etc., to provide restraint in one or both directions. The tubing could be controlled only by gravity and varying circulation rates. The valve units are designed to allow slow circulation with little differential until the actual flow resistance through the valves causes inflation. Then as flow rates are increased the differential pressure will increase until ring valve operates to control inflation pressure by limiting inflation so fluids can bypass outside of the element. As high circulation rates are established the finger valves will restrict fluid entry into the element so differential across the piston unit will drop considerably. Only after circulation is reduced will the finger valves re-open. Thus, easy circulation is possible at both low and high rates, and the piston units will do work at high differentials at intermediate rates.

It will now be seen that a new and improved piston unit adapted to be pumped through a flow conductor for transporting a flexible pipe through the conductor has been described and illustrated.

It will be seen that the pipe transporting form of piston unit includes a pair of annular valve units supported on the pipe in longitudinal spaced relation supporting therebetween an expandable and contractible seal assembly to seal between an inner wall of a flow conductor and the flexible pipe extending through and propelled by the piston unit.

It will be further seen that during the flow of displacing fluid through the piston unit the valve unit at the downstream end of the piston unit initially opens to reduce the pressure differential across the seal assembly and subsequently the valve unit at the upstream end of the piston unit is actuated to restrict flow into the piston unit further reducing the expanding force in the seal assembly.

It will be further seen that the piston unit is double acting and thus may be pumped in either direction through a flow conductor.

It will also be seen that each of the valve units restricts flow responsive to a predetermined flow rate in one direction while increasing fluid flow responsive to a predetermined fluid flow rate in the other direction and such units are supported at opposite ends of the piston unit disposed in opposite directions.

It will be further seen that each of the valve units includes means for locking the unit on a body and has structure defining an annular flow passage within the unit around the body and coaxial therewith and including valve means movable by flow in a first direction for increasing fluid flow through the valve unit and valve means movable by fluid flow in the other direction decreasing fluid flow through the unit.

It will be additionally seen that each of the valve units has annular means for locking the valve unit on a body and providing restricted flow passages along the body, a valve ring movable relative to the locking means for varying the restricted flow passage means and valve sleeve means movable relative to the locking means and the valve ring for further varying the restriction to flow through the valve unit.

A still further form of piston unit embodying the invention for propelling tools, instruments, and the like through a flow conductor is illustrated in FIGURES 27 through 30. Referring to the drawings, the piston unit 450 is identical in all respects to the piston unit 230 of FIGURE 11 other than including a modified form of valve. Thus, the piston unit 450 includes a seal assembly 23 supported on a mandrel 231 which is provided with a longitudinal bore 232 in which is secured a sleeve type valve seat 265 having lateral ports 269 aligned with the mandrel ports 234. Further specific details of the seal assembly mandrel and valve seat are described above in connection with the piston unit 230.

The piston unit 450 has a valve 451 which is movable longitudinally within its mandrel bore responsive to fluid pressure differentials applied across the piston unit for controlling communication into the chamber 31 of the seal assembly from both upstream and downstream of the piston unit to vary the inflation of the seal assembly inversely with the presssure differential applied across the piston unit. The valve has a rod 452 which has end portion features identical to those of the valve in the piston unit 230 and which are therefore identified by the same reference numerals as used in FIGURE 13. The valve rod is slidably supported within the bore of the mandrel biased toward a central position by the springs 295 which are each confined on an end portion of the valve rod by a sleeve 304a identical to the sleeve 304a shown and described in connection with the piston unit 230, the features of which are thus denoted by the same reference numerals as used in FIGURES 11 and 12. As previously stated, the sleeve 304a and the features of the end portions of the valve rod cooperate to provide releasable holding means for the valve springs in the form of the previously described detent mechanism. Each sleeve is held against the compressed spring by its internal lugs 307 engaging the rod shoulder surfaces 288. During installation and removal the sleeve is pushed against the spring compressing it until the lugs are aligned with the round portions 285 of the valve rod which allows the sleeve to be rotated for alignment of its lugs with the rods surfaces 286b when locking the sleeve on the rod.

The valve rod 252 is slidable through a pair of identical annular valve members 453 spaced apart at opposite ends of the valve seat 265. Each of the valve members is biased by a spring 295 toward seated relationship, FIGURE 27, with the annular valve seat. Each valve member has an external annular shoulder surface 454 engageable with an internal annular seat surface 265a of the valve seat. A pressure differential across each valve member toward its spring tends to move the valve member from the valve seat to serve a secondary valve function for permitting greater flow from within the seal assembly to the downstream end of the piston than allowed by the valve rod alone, as discussed below.

The valve rod 452 is provided along its central portion with a pair of identical spaced laterally opening blind recesses 460 each of which functions to communicate upstream pressure into the seal assembly. To provide for progressively increasing communication into the seal assembly proportional to increases in the pressure differential applied across the piston unit, each of the recesses 460 is progressively deeper as the recess extends from the center of the valve rod. The valve rod also has a central recess 461 longitudinally spaced along the valve rod relative to the recesses 460 to communicate the chamber 31 of the seal assembly with the downstream pressure at a predetermined relationship to the upstream communication into the seal assembly. The recess 461 is progressively deeper toward the center of the valve rod so that as the valve rod is moved farther toward the downstream end of the piston unit the communication is increased between the seal assembly chamber and the downstream end of the piston unit. The diameter of the central portion of the valve rod is less than the bores through the valve members 453 by an amount sufficient to provide the desired minimum restriction above and below the ports 234 so that when none of the rod recesses are functioning, FIGURE 27, the desired minimum flow may occur through the valve.

The primary valve function of the rod 452 is produced by movement of the rod recesses 460 and 461 relative to the valve members 453 while the valve members remain spring biased against the valve seat 265. The valve members 453 each perform a secondary valve function to reduce the pressure differential between the seal assembly chamber 31 and the pressure downstream of the piston unit at higher pressure differentials across the piston unit. The spacing, size, and shape of the valve rod recesses and the positioning of the valve members 453 are correlated so that when the valve rod is at the neutral position of FIGURE 27 communication into the seal assembly chamber is through maximum restrictions of the mandrel bore obtained above and below the ports 269 and the pressure in the chamber 31 is of a value intermediate the values of downstream and upstream pressures. When the valve rod is forced by a pressure differential toward the downstream end of the piston unit there is a lag between the action of the recess 460 at the upstream end of the rod and the recess 461. The upper recess 460 first passes through the upper valve member 453 communicating the upstream portion of the mandrel bore with the seal assembly chamber thus effectively enlarging the restriction above the ports 269. Then, the recess 461 passes through the lower valve member 453 communicating the downstream mandrel bore portion with the seal assembly chamber and thus effecting enlarging the restriction in the mandrel bore below the ports 269 in a lagging relationship to the enlarging of the upper restriction.

The piston unit 450 is used in the same manner to discharge the same functions in transporting tools, instruments, and the like through a flow conductor as the previously described piston units. With the piston unit coupled with apparatus to be transported by it and positioned within a flow conductor, displacing fluid is pumped through the conductor into the upper end of the piston unit. Under static conditions, as when the piston unit is inserted into the flow conductor and before displacing fluid pressure is applied across it, the valve rod 452 is biased by the springs 295 to the central neutral position shown in FIGURE 27. The displacing fluid is pumped into the piston unit applying a pressure differential across the valve 451 between its upper upstream end and its lower downstream end. When the pressure differential across the valve is sufficient to compress the upper valve spring 295 the valve rod 452 moves downwardly in the valve members 453 which remain engaged with the valve seat 265. The upper valve member 453 is seated on the upper shoulder surface 265a of the valve seat 265 while the lower valve seat 253 is held against the lower shoulder 265a of the valve seat by the lower spring 295. As the valve rod moves downwardly the upper spring is compressed while the lower spring is expanded. When the lower end of the upper recess 460 moves out of the bore of the upper valve member 453, FIGURE 29, upstream fluid pressure is communicated at a higher rate into the seal assembly. The upstream fluid pressure is transmitted around the valve rod within the bore of the mandrel above the valve member 453 downwardly through the upper valve rod recess 460 within the bore of the upper valve member 453 into an annular space 266 around the valve rod within the valve seat 265 between the upper and lower valve members 453. The pressure is then transmitted outwardly through the valve seat ports 269 and the mandrel ports 234 into the seal assembly chamber 31 expanding the seal assembly more tightly against the inner wall of the flow conductor. Since the exterior of the seal assembly is exposed to a lower downstream pressure below the line of sealing of the outer surfaces of the seal segments 70 with flow conducting wall, the seal assembly is expanded or tends to expand due to the higher upstream pressure within it. Due to the spacing of the recesses 460 and 461, the lower end of the recess 461 is still within the bore of the lower valve member 453 when the seal assembly is first exposed to upstream pressure.

Further increases in the displacing fluid pressure differential across the piston unit force the valve rod still farther downwardly with the lower end of its recess 461 moving out of the bore of the lower valve member 453 further compressing the upper valve spring 295 and permitting the lower valve spring 295 to expand while holding the lower valve member 453 at its seated position against the lower shoulder 265a of the valve seat. Increase in the mandrel bore orifice below the ports 234 allows pressure in the chamber to decrease and results in a net reduction in the fore tending to expand the seal assembly so that the frictional resistance between the seal assembly and the flow conductor wall is reduced relative to the increases in the pressure differentials being applied across the piston unit. The increasing communication of the interior of the seal assembly with downstream pressure tends to equate the seal assembly interior pressure and the downstream pressure thereby reducing the tendency of the seal assembly to expand as the valve rod moves downwardly.

Further increases in the pressure differential across the piston unit force the valve rod farther downwardly moving the larger portions of the valve rod recesses 460 and 461 below their respective upper and lower valve members 453 thereby increasing the communication of the interior of the seal assembly with both the upstream and downstream pressures. When the pressure differential across the piston unit is still further increased the valve rod is moved still farther downwardly and the pressure differential across the lower valve member 453, if sufficiently great, produces a downward force on the lower valve member forcing it downwardly on the valve rod compressing the lower spring 295. The lower valve member is moved to a spaced position below the valve sleeve 265, FIGURE 29, which substantially increases the flow capacity past the valve member downwardly from the seal assembly chamber. The annular space within the valve seat between the shoulder surfaces 454 and 265a provide substantially more flow area than the cross section of the valve rod recess 461. The pressure drop through the enlarged flow space past the lower valve member is further reduced to further decrease the pressure differential between the interior of the seal assembly and the downstream pressure around the lower outside of the seal assembly. The force expanding the seal assembly is still further reduced while the flow rate through the piston unit is increased to a maximum and the seal assembly is forced inwardly by the higher upstream pressure around the seal assembly within the flow conductor so that fluid bypasses downwardly within the flow conductor around the seal assembly. Of course, at any time operating conditions develop which reduce the pressure differential across the piston unit, the lower spring 295 returns the lower valve member 453 upwardly while the upper spring 295 lifts the valve rod 452 back reducing the fluid communication into the seal assembly chamber from both the upstream and downstream ends of the piston unit tending to expand the seal assembly.

During the pumping of the piston unit along the flow conductor when the resistance to movement of the unit is reduced until the piston unit is moving along at or about the same rate as the displacing fluid so that little pressure differential is applied across the piston unit, the valve springs return the valve rod to the neutral portion of FIGURE 27. The pressure within the seal assembly is equalized with the pressure around the assembly so that only the normal low load interference fit exists between the seal element and the flow conductor wall.

The piston unit 450 is operable with equal facility in either direction and thus may be returned to the surface in an upward direction by pumping displacing fluid into the lower end of the piston unit. The valve rod is forced upwardly with the lower recess 460 initially communicating the seal assembly chamber with the higher upstream pressure from below the piston unit and subsequently the recess 461 providing communication with the lower downstream pressure above the piston unit. The maximum pressure differential across the piston unit lifts the upper valve member 453 against its spring 295 to provide maximum fluid communication between the seal assembly chamber and the downstream pressure above the upwardly moving piston unit resulting in minimum expansion of the seal assembly.

FIGURE 30 illustrates an alternate form of construction of the central portion of the valve rod 452 to provide a piston unit which is readily altered to adapt it to operating condition changes. The central portion of the valve rod 452 is provided with an elongated lateral pocket 470 which receives a removable insert 471 having an outer cylindrical surface portion 472 coinciding with the cylindrical surface of the valve rod when the insert is in the pocket 470. The insert 471 has a pair of upper and lower longitudinal slots 460a and a central longitudinal slot 461a circumferentially spaced from the slots 460a. The slots 460a and 461a correspond respectively with the slots 460 and 461 of the valve rod 452. The insert also has reduced opposite end portions 472a which cooperate with the end surfaces 470a of the slot 470 providing substantial flow area into the recesses 460a at their opposite ends so that when the rod with the insert is moved to extreme end position flow into the slots 460a is not throttled but remains at a maximum rate until abruptly cut off by passage of the slot end surfaces 470a into the base of the valve member 453.

A plurality of inserts 471 may be provided to fit the valve rod pocket 470 with each of the inserts having different relationships between the length, spacing, and configurations of the slots 460a and 461a to provide a multiplicity of variations in the valving function of the valve rod for meeting various operating conditions of the piston unit with alternations of the valve rod being possible with a minimum of effort. With the insert exactly fitting the pocket of the valve rod and the outer surface of the insert being coincident with the cylindrical surface of the valve rod, the insert is held in the rod by the surfaces defining the bores through the upper and lower valve members 453. By disconnecting the sleeve 304a at either end of the valve rod the valve rod is withdrawn through the other end of the piston unit mandrel, the inserts 471 are changed, and the valve rod is reinserted into the bore of the piston unit with the removed spring 295 and sleeve 304a being reinstalled on the end portion of the valve rod.

A piston unit using the modified valve rod 452A operates in all respects exactly as the piston unit 450 in accordance with the above described procedures.

The valves of the piston units of FIGURES 27 and 30 differ from the previous piston units in three very important ways. First, since the valve rod is suspended in an unrestrained manner between its two springs it is movable by very small differentials. The other piston units operate generally between 200 and 250 p.s.i. and at lower differentials no controlled external bypass was possible.

Now, even though the springs are preloaded the same differential acting on the rod moves it a proportional amount. The magnitude of this movement now is reduced to one-half, or in effect the spring rate is doubled, because the force resulting from a differential across the sensing area of the rod is equally divided between the springs, with half added to the upstream spring load and half subtracted from the downstream spring load. By designing the inflationary orifice 460a, FIGURE 30, twice as large as the deflationary orifice at the ends of flats 461a a high degree of controlled inflation with subsequent controlled external bypass should be possible at all values of differential. Also, at maximum differential the inflation orifice that has been increasing is now abrupty cut off by the entry of the end 470a of the slot 460a into the upstream valve member and at the same time the differential acting on the downstream valve member will exceed its spring load, now acting at normal rate instead of double rate, and the valve will leave its seat 265a to deflate the piston very rapidly. This could be critical if the piston is moving very rapidly and passes an obstruction such as a landing nipple or sliding sleeve and it is necessary to avoid a sharp pressure pulse to prevent rupturing the element or shifting the sleeve. Secondly, all throttling takes place through inexpensive, easily replaceable parts rather than across internal flanges in the expensive mandrel. Thirdly, throttling takes place through constantly varying rectangular orifices and the problems of wear, plugging, and binding of a tight fitting annular orifice are minimized.

The valves of the piston units of FIGURES 27 and 30 may be considered as discharging a servo valve function in the sense that the bypassing of substantial volumes of fluid along the outside of the seal assembly is controlled by the flow of a relatively small quantity of fluid passing through the central flow passage of the apparatus actuating the valve rod to control pressure communication into the seal assembly.

It will now be seen that a still further form of piston unit embodying the invention includes a valve which is biased to a neutral position providing minimum communication into the seal assembly chamber from both upstream and downstream pressures when the pressure differential across the valve is below a predetermined value, which, when subjected to a pressure differential in excess of such value moves to a position increasing fluid communication with the upstream pressure while continuing minimum communication with the downstream pressure, and which with further pressure differential increases moves to a position providing maximum communication between the seal assembly and both upstream and downstream pressure.

It wil be further seen that the valve of the piston unit includes secondary valve means movable responsive to a maximum pressure differential across the valve to provide maximum communication between the seal assembly chamber and the downstream pressure.

It will be still further seen that the piston unit includes a valve having a valve rod provided with spaced longitudinal recesses for fluid communication between the upstream pressure and the seal assembly chamber and a central longitudinal recess for fluid communication between the downstream pressure and the seal assembly chamber.

It will be also seen that an alternate form of the valve rod for the piston unit includes an insert having spaced longitudinal recesses for communicating the upstream pressure with the seal assembly chamber and a central recess for communicating the downstream pressure into the seal assembly chamber.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. Apparauts adapted to be pumped through a flow conductor comprising: annular expandable seal means; means supporting said seal means and pumpable for movement longitudinally of said flow conductor by fluid pressure in said conductor; means for communicating fluid pressure into said seal means for expansion of said seal means within said flow conductor; and regulating valve means comprising means for controlling the admission of fluid pressure into said seal means and means for controlling the exhaust of fluid pressure from within said seal means, said regulating valve functioning responsive to the fluid pressure differentials applied across said apparatus within said flow conductor to control the inflation and deflation of said seal means within said flow conductor in a predetermined relationship with said fluid pressure differentials for controlling interface pressure between said seal means and the inner wall of said flow conductor and permitting predetermined fluid bypass past said seal means in either direction variable under predetermined conditions.

2. Apparatus as defined in claim 1 wherein said regulating valve means includes means for providing variable fluid pressure communication into and from said seal means from both upstream and downstream of said apparatus, and for providing fluid communication into said seal means variable to a minimum from upstream of said apparatus and for providing fluid communication from said seal means variable to a maximum to downstream of said apparatus.

3. Apparatus of the character set forth in claim 2 wherein the outside surface of said seal means and the inside surface of said flow conductor define an annular bypass flow passage exteriorly of said seal means communication at opposite ends with said flow conducter upstream and downstream of said seal means for conducting fluid pressure exteriorly past said seal means when fluid flow is restricted at the upstream end of said seal means.

4. Apparatus as defined in claim 1 wherein said regulating valve means includes variable orifice means providing fluid communication into said seal means from upsteam of said apparatus and variable orifice means providing fluid communication into said seal means from downstream of said apparatus, said orifice means being responsive to a pressure differential across said apparatus within said flow conductor, said variable orifice means providing substantially equal minimum fluid communication into said seal means from both upstream and downstream of said apparatus responsive to a predetermined pressure differential within said flow conductor across said apparatus, said variable orifice means providing fluid communication variable from a maximum to a minimum into said seal means from upstream of said apparatus and also providing fluid communication variable from a minimum to a maximum from said seal means to downstream of said apparatus within said flow conductor responsive to different pressure differentials applied across said apparatus within said flow conductor.

5. Apparatus as defined in claim 1 wherein said regulating valve means comprises means for providing substantially equal fluid communications from both upstream and downstream of said apparatus within said flow conductor, means for increasing communication between seal means and fluid pressure within said flow conductor downstream of said apparatus responsive to an increase in fluid pressure differential across said apparatus, and means for reducing communication between said seal means and fluid pressure upstream of said apparatus within said flow conductor responsive to a still further increase in fluid pressure differential applied within said flow conductor across said apparatus.

6. Apparatus as defined in claim 1 wherein said regulating valve means comprises means for providing substantially equal minimum fluid communication into said seal means from within said flow conductor both upstream and downstream of said apparatus, means for maintaining substantailly the same minimum fluid communication into said seal means from downstream of said apparatus while increasing fluid communication into said seal means from upstream of said apparatus within said flow conductor responsive to an increase in the pressure differential applied within said flow conductor across said apparatus, means for increasing fluid communication into said seal means from downstream of said apparatus within said flow conductor while simultaneously decreasing fluid communication into said seal means from upstream of said apparatus within said flow conductor responsive to a further increase in the pressure differential applied within said flow conductor across said apparatus, and means for still further increasing fluid communication into said seal means from downstream of said apparatus within said flow conductor responsive to a still further increase in the pressure differential applied within said flow conductor across said apparatus.

7. Apparatus of the character set forth in claim 1 adapted to be pumped through a flow conductor for transporting a flexible pipe through said flow conductor, wherein said pipe comprises said support means and said flow regulating means comprises: a pair of annular valve means secured on said pipe in longitudinally spaced relationship from each other and providing variable flow restricting passage means for increasing and decreasing fluid flow therethrough, each of said valve means being adapted to restrict flow at an upstream end of said apparatus and to permit increased flow at the downstream end of said apparatus to control the fluid pressure differential across said annular seal means and wherein said annular seal means is supported surrounding said pipe between said valve means for sealing around said pipe within said flow conductor, the outside surface of said seal means and the inside surface of said flow conductor defining an annular bypass flow passage exteriorly of said seal means communicating at opposite ends with said flow conductor upstream and downstream of said seal means for conducting fluid pressure exteriorly past said seal means when fluid flow is restricted at the upstream end of said seal means.

8. Apparatus as defined in claim 7 wherein each of said valve means includes first and second valve members for varying fluid flow through said valve means, said first valve member being movable responsive to a predetermined first pressure differential across said valve unit in a direction away from said seal means for moving said first valve member to enlarge the flow restriction through said valve means and said second valve member being movable responsive to a predetermined second pressure differential across said valve means of a value exceeding the said first pressure differential toward said seal means for moving said second valve member to a position reducing said restriction through said valve means.

9. Apparatus as defined in claim 7 wherein each of said valve means comprises: locking means for securing said valve means on said flexible pipe; means defining a restricted flow passage means through said valve means including a valve member biased resiliently toward said locking means and adapted to be moved by a pressure differential in one direction away from said locking means for enlarging said restricted flow passage means through said valve means; and second valve member means biased away from said first valve member means and adapated to be moved by a pressure differential in a second direction toward said first valve member means to reduce said restrictive flow passage means through said valve means.

10. Apparatus as defined in claim 7 wherein said valve means comprises: locking means for securing said valve means on said flexible pipe and defining an orifice through said valve means; first valve member means biased toward said locking means for restricting said orifice and adapted to be moved away from said locking means responsive to a pressure differential in a direction from said locking means so that said orifice is not restricted; and second valve member means biased away from said first valve member means and adapated to be moved by a pressure differential in an opposite direction toward said first valve member means to a position relative to said first valve member means further restricting fluid flow through said valve means.

11. Apparatus as defined in claim 7 wherein each of said valve means comprises: split-ring locking means positioned on said flexible pipe for securing said valve means against longitudinal movement on said pipe, said spilt-ring locking means defining orifice means through said valve means; a valve ring around said flexible pipe baised toward said split-ring means extending across said orifice means restricting said orifice means and movable away from said split-ring means by a pressure differential; split-sleeve valve means disposed around said flexible pipe biased away from said valve ring, said split sleeve having finger portions extending through said valve ring into said orifice means, said split-sleeve valve means being adapted to be displaced toward said valve ring responsive to a pressure differential for still further restricting fluid flow through said valve means; spring means between said valve ring and said split-sleeve valve means for basing said valve ring and said split sleeve valve in opposite directions; and housing means disposed around and enclosing said locking means, said ring valve means, said spring means, and said split-sleeve valve means for supporting said members around said flexible pipe and defining an annular space with said flexible pipe in which said members are disposed.

12. Apparatus as defined in claim 7 wherein each of said valve means comprises: a split lock ring having inner surface portions adapted to engage said flexible pipe for locking said valve means on said flexible pipe, said split-ring having spaced edge surfaces defining restricted flow passages between said split rings; a valve ring biased against end faces of said split ring further restricting said flow passages and movable away from said split-ring decreasing the pressure differential across said valve means; split-sleeve valve members disposed around said flexible pipe having finger portions extending between said split-ring edge surfaces and through said valve ring and having shoulder surface portions engageable with said valve ring for limiting fluid flow through said valve ring member; a spring confined between and biasing said valve ring and said split sleeve valve members in opposite directions; tubular housing means secured around said split lock ring, said valve ring, said spring, and said split-sleeve valve member, said housing means having an inside surface portion engaging said split lock ring holding said ring against said flexible pipe and having an internal shoulder surface engageable by an end surface on said split-sleeve valve members for confining said members within said housing and limiting movement of said members away from said ring valve members; said ring valve being movable away from said split lock ring for reducing the effective restriction between said lock ring members responsive to a pressure differential in a direction from said annular seal means toward said valve means and said split-sleeve valve members being movable toward said ring valve responsive to a pressure differential in a direction from said valve means toward said annular seal means for restricting fluid flow through said ring valve toward said split lock ring.

13. Apparatus adapted to be pumped through a flow conductor comprising: mandrel means having a longitudinal flow passage extending longitudinally thereof; annular seal means supported on said mandrel means and expandable into engagement with said flow conductor, an outer surface portion of said mandrel means and an inner surface portion of said seal means defining an annular chamber within said seal means around said mandrel means; said mandrel means having lateral port means connecting said mandrel flow passage with said annular chamber; said flow passage and said lateral port means communicating fluid pressure within said flow conductor at opposite ends of said seal means with said annular chamber; and valve means supported on said mandrel means in said flow passage for controlling fluid pressure admitted through said flow passage and said lateral port means into said annnular chamber and for controlling fluid pressure exhausted from said annular chamber through said port and flow passage means, said valve means being operable in response to fluid pressure to selectively control the admission and exhaust of fluid pressure from both upstream and downstream of said seal means into said annular chamber to vary the pressure within said seal means to control interface pressure engagement of said seal means with said flow conductor.

14. Apparatus as defined in claim 13 wherein said valve means comprises: first and second valve members supported for simultaneous movement as a unit between opposite end positions and for movement independently of each other relative to said mandrel port means; means resiliently biasing said members toward each other to relative positions for maximum communication of upstream pressure into said mandrel port means while providing minimum communication of downstream pressure into said port means at each of said opposite end positions of said valve means; each of said valve members being independently movable relative to the other in a downstream direction for communicating said annular chamber with downstream pressure while said valve members cooperate to maintain minimum fluid communication with said upstream pressure responsive to an increasing pressure differential between the upstream and downstream ends of said apparatus within said flow conductor.

15. Apparatus as defined in claim 14 wherein said valve members include intermeshing finger portions each having recess and flange portions adapted to be aligned and misaligned relative to each other for controlling said fluid communication with said mandrel ports.

16. Apparatus as defined in claim 15 wherein said valve members are supported in slidable intermeshed relationship on telescopically related longitudinal members coupled by spring means biasing said telescopically related members in opposite directions for biasing said valve members together and permitting limited movement in opposite direction of said valve members responsive to pressure differentials applied across said valve.

17. Apparatus as defined in claim 13 wherein said valve means comprises: a pair of substantially identical oppositely disposed valve members having intermeshing longitudinal finger portions each having spaced flange means defining recess means therebetween and a stop shoulder, said stop shoulders being longitudinally spaced and each engageable with a flange shoulder surface in said mandrel flow passage permitting limited longitudinal movement of said valve means between opposite end positions in said mandrel flow passage; sleeve means disposed through said valve members; securing means extending slidably through said sleeve means holding said valve members on said sleeve means; spring means confined between said securing means and said sleeve means for biasing said valve members toward each other and permitting limited longitudinal movement of each of said valve members away from the other responsive to pressure differentials applied across said valve within said flow passage of said mandrel; said valve being movable as a unit between end positions limited by said stop shoulder on said valve members while said valve members are biased together for communicating either upstream portion of said mandrel flow passage with said mandrel port means while restricting communication of the downstream portion of said mandrel flow passage with said port means to a minimum value, and each of said valve members being movable in a downstream direction to a position for restricting fluid communication from both upstream and downstream portions of said flow passage into said mandrel ports to a minimum value in response to a first pressure differential across said valve while the other of said valve members is held against movement in said direction applied across said valve within said mandrel flow passage and for moving said valve member to a further spaced position relative to the other of said valve members for providing maximum fluid communication into said mandrel ports from the downstream portion of said mandrel flow passage while limiting said communcation with the upstream portion of said flow passage to a minimum value.

18. Apparatus in accordance with claim 13 wherein said valve means comprises a valve member having longitudinally spaced external flange portions movable within a reduced flow passage portion of said mandrel flow passage said valve member flange portions coacting with inner wall surfaces of said reduced flow passage portion on opposite sides of said mandrel port means for controlling communication into said mandrel port means from said mandrel flow passage; supporting means coupled with said valve member for supporting said valve member within said flow passage for limited movement through said reduced portion of said flow passage; said supporting means including means resiliently biasing said valve member to an end position on said supporting means; said valve member being movable in either direction from one end position within said mandrel flow passage by a fluid pressure differential applied across said valve means for initially communicating an upstream portion of said flow passage with said mandrel port means while substantially restricting communication of a downstream portion of said mandrel flow passage with said port means, said valve member being movable by an increased pressure differential to an intermediate position to align said flange portions on said valve member within said reduced flow passage portion for substantially restricting fluid communication from both upstream and downstream portions of said mandrel flow passage with said mandrel port means, and said valve being still further movable to another end position aligning said flange portions of said valve member within said reduced flow passage portion for providing maximum communication between said downstream portion of said flow passage and said mandrel port means while substantially restricting communication into said ports along from said upstream portion of said mandrel flow passage.

19. Apparatus as defined in claim 18 wherein said valve member is supported on telescopically related bolt means and sleeve means spring biased in opposite directions supporting said valve member for resilient movement in either direction thereon.

20. Apparatus as defined in claim 19 wherein said valve member comprises spool-shaped structure having four longitudinally spaced external annular flanges.

21. Apparatus as defined in claim 19 wherein said valve member comprises spool-shaped structure having external annular end flanges and an intermediate external annular flange.

22. Apparatus as defined in claim 18 wherein said valve member is integral with opposite end stem portions and a biasing spring is supported on each said stem portion biasing said valve member in an upstream direction.

23. Apparatus as defined in claim 13 wherein said valve means comprises a valve rod having spaced recesses for communicating said mandrel port means with upstream pressure and a central recess for communicating downstream pressure with said mandrel port means.

24. Apparatus as defined in claim 23 including spaced secondary valve members around said valve rod, each for increasing the communication between said mandrel port means and said downstream pressure.

25. Apparatus adapted to be pumped through a flow conductor comprising: a mandrel having a longitudinal flow passage therethrough and provided with a lateral port intermediate the ends thereof; a seal assembly supported on said mandrel over said mandrel port whereby communication is provided between said flow passage through said mandrel and the interior of said seal assembly through said mandrel ports for applying fluid pressure from said flow passage into said seal assembly for controlling inflation and deflation of said seal assembly; and a valve disposed in said flow passage through said mandrel for controlling communication between said flow passage and the interior of said seal assembly from both upstream and downstream portions of said flow passage comprising an elongate valve rod having stem end portions and a central valve member having external annular flange portions movable within said mandrel flow passage relative to said mandrel ports for selectively communicating both upstream and downstream portions of said mandrel flow passage with the interior of said seal assembly through said mandrel port responsive to a fluid pressure differential applied across said valve; a biasing spring supported on each stem portion of said valve rod, spring retainer and valve stop means supported on each valve rod stem portion adjacent said valve member portion of said valve rod biased by said spring on said stem portion toward said valve member portion of said valve rod, and spring retainer means on each of said valve rod stem portions over the free end portions thereof for supporting the said biasing spring at the free end of said valve rod stem portion; annular valve seat means secured within said mandrel flow passage around said valve rod for cooperating with said flange portions of said valve rod to control fluid flow into said mandrel portion, said first valve stop and spring retainer means on each of said stem portions of said valve rod being engageable with an end surface of said valve seat means for limiting movement of said valve between end positions within said mandrel flow passage for providing maximum fluid communication into said seal assembly from an upstream portion of said mandrel flow passage while providing minimum fluid communication from the said seal assembly to the downstream portion of said mandrel flow passage, said valve rod being movable when said valve is at either of said end positions toward the downstream end of said piston unit against the said biasing spring on the upstream valve stem portion of said valve for progressively limiting upstream communication into said seal assembly until fluid communication is restricted to a minimum from both the upstream and downstream portions of said mandrel flow passage into said seal assembly, and said valve rod being subsequently movable to a downstream position for providing maximum restriction to fluid communication from the upstream portion of said mandrel flow passage into said seal assembly while providing maximum fluid communication from the downstream portion of said mandrel flow passage into said seal assembly.

26. Apparatus adapted to be pumped through a flow conductor comprising: a mandrel having a longitudinal flow passage therethrough and having lateral port means communicating with said flow passage; annular seal means supported on said mandrel over said mandrel port means and defining with said mandrel an annular chamber within said seal means; a tubular valve seat secured within said mandrel flow passage, said valve seat having port means communicating with said mandrel port means; an annular valve member biased against a seat surface of said valve seat on each opposite side of said port means in said valve seat; a valve rod slidably disposed through said annular valve members, said valve rod having longitudinally spaced recess means each providing fluid communication through each of said annular valve members from an upstream portion of said mandrel flow passage into said valve seat port means, only one of said spaced valve rod recess means being in communication with said valve seat port means at any longitudinal position of said valve rod, and said valve rod having a central recess independent of said longitudinally spaced rod recesses for communicating a downstream portion of said mandrel flow passage with said port means in said valve seat, said central recess communicating with only one downstream portion of said mandrel flow passage at any one longitudinal position of said valve rod; a spring disposed on each end portion of said valve rod; a spring retainer on each valve rod end portions confining said spring between said retainer and one of said annular valve members on said rod adjacent to said spring; each of said annular valve members comprising secondary valve means operable supplementary to said central recess of said valve rod movable in a direction away from said valve seat toward the downstream end of said piston unit responsive to a pressure differential across said valve member for increasing fluid communication into said valve seat port from a downstream portion of said mandrel flow passage.

27. Apparatus as defined in claim 26 including a valve rod wherein said spaced recesses and said central recess are provided in a removable longitudinally extending insert disposed in a longitudinal recess in said valve rod.

28. Apparatus as defined in claim 26 wherein said central recess of said valve rod is positioned in predetermined relation to said spaced recesses whereby when said valve rod is displaced in either longitudinal direction toward a downstream end of said apparatus by a pressure differential applied across said apparatus said spaced recess toward the upstream end of said apparatus communicates upstream pressure into and through said port means of said valve seat before said central valve rod recess communicates downstream pressure into said port means of said valve seat.

29. Apparatus adapted to be pumped through a flow conductor comprising: a mandrel having a longitudinal bore therethrough defining a flow passage and having lateral port means communicating with said flow passage; flexible seal means supported on said mandrel defining with said mandrel an annular chamber within said seal means communicating with said mandrel port means for communicating fluid pressure from said flow passage into said seal means; annular valve seat means within said mandrel bore provided with port means communicating with said mandrel port means; primary valve means comprising a valve rod slidably disposed within said mandrel bore for longitudinal movement through said annular valve seat means, said primary valve means having recess means adapted to selectively communicate said mandrel bore with said mandrel port means as said valve means moves within said mandrel bore, said primary valve means providing restricted fluid communication into said mandrel port means from both upstream and downstream of said valve means at one position of said primary valve means, increased fluid communication from an upstream portion of said mandrel bore with said mandrel port means while maintaining restricted communication from downstream of said valve means at second positions of said primary valve means, and simultaneous increased communication between said mandrel port means and both upstream and downstream of said valve means at third positions of said primary valve means; spring means on said primary valve means on each side of said annular valve seat means for biasing said primary valve means toward an upstream end of said apparatus; and annular secondary valve means around said valve rod on opposite sides of said annular valve seat means for increasing fluid communication between said mandrel port means and a downstream portion of said mandrel bore responsive in excess of that provided by said primary valve means responsive to a pressure differentials across said valve means in excess of a predetermined value.

30. A well tool movable through a flow conductor by fluids circulated through the flow conductor, said well tool including: an annular seal assembly expandable radially outwardly to engage internal surfaces of a flow conductor through which said well tool is movable, said seal assembly having an internal annular chamber; means supporting said seal assembly and providing fluid communication passage means into said annular chamber from said flow conductor upstream and downstream of said seal assembly, said supporting means and said seal assembly being pumpable to move longitudinally of said flow conductor by fluid pressure in said conductor; said seal assembly being biased outwardly toward engagement with the internal surfaces of said flow conductor by the force of fluid pressure in said chamber exerted on inwardly facing surfaces of said seal assembly, said seal assembly being biased inwardly by fluid pressure in the flow conductor exerted on outwardly facing surfaces of said seal assembly exposed to fluid pressure in the flow conductor along opposite upstream and downstream exterior portions of said seal assembly; and regulating valve means on said mandrel for controlling fluid communication through said passage means into said annular chamber, said valve means being response to the pressure differential across said well tool for regulating fluid pressure admitted in said chamber from upstream and fluid pressure exhausted from said chamber to downstream to vary the force with which said seal assembly is biased radially outwardly by said fluid pressure in said chamber and control the force with which said seal assembly engages the internal surfaces of said flow conductor.

31. The well tool of claim 30 wherein said valve means includes means providing a first variable effective orifice along a first portion and means providing a second variable effective orifice along a second portion of said valve means for regulating fluid communication into and out of said annular chamber.

32. The well tool of claim 31 wherein said first variable effective orifice comprises means for varying the size of said first orifice responsive to a fluid pressure differential across said seal assembly in excess of a predetermined value, and said second variable effective orifice comprises means for enlarging said second effective orifice responsive to a fluid pressure differential in excess of said predetermined value across said seal assembly.

33. The well tool of claim 31 wherein said means for supporting said annular seal assembly comprises a mandrel providing a longitudinal passage within said seal assembly communicating with the flow conductor at opposite ends, said mandrel having a port providing fluid communication between said longitudinal flow passage and said annular chamber, and said regulating valve means is disposed within said longitudinal passage and movable therein between first and second positions, and means is provided biasing said valve means to said first position wherein it causes the effective orifice of said first portion of said passage between said port and the upstream end of said tool to be relatively great and the effective orifice of said second portion of said passage between said port and the downstream end of said tool to be relatively small whereby the pressure in said annular chamber is substantially equal to upstream pressure when said valve means is in said first position and said seal assembly is held in its radially expanded position engaging the internal surfaces of the flow conductor when the downstream pressure is lower than the upstream pressure in said flow conductor.

34. The well tool of claim 33, wherein said valve means is moved from said first position toward said second position when the pressure differential across said valve is increased to a predetermined value, said valve means when in said second position causing the orifice of said first portion of said passage to be relatively small and the orifice of said second portion of said passage to be relatively great whereby the pressure in said chamber is substantially equal to the downstream pressure and said seal assembly is moved to its radially retracted position and out of engagement with the internal surfaces of a flow conductor by the force of the upstream pressure and fluid flow can take place through the flow conductor externally of and past said well tool.

35. The well tool of claim 34, wherein said valve means as it moves from its first position toward an intermediate position between said first and second positions as the pressure differential across said valve increases causes the orifice of said first portion of said passage to gradually decrease while maintaining the orifice of said second portion substantially constant and relatively small and then causes the orifice of said second portion of said passage to increase and the orifice of said first portion to remain constant and relatively small as the valve moves from said intermediate position to said second position when the pressure differential exceeds said predetermined value whereby said valve means as it moves between said first and intermediate position causes the pressure in said chamber to vary relative to the upstream pressure and remain above the downstream pressure to maintain the force with which the seal assembly engages internal surfaces of a flow conductor within a predetermined value when the said pressure differential is below said predetermined value and then causes the said valve assembly to be moved to its retracted position when the pressure differential exceeds said predetermined value and said valve means moves from said intermediate position to said second position.

36. Servo valve apparatus for controlling flow through a first flow passage means responsive to flow through a second flow passage means comprising: body means provided with a longitudinal flow passage therethrough and having lateral port means communicating with said longitudinal flow passage; expansible and contractable valve means supported in communication with said lateral port means for controlling flow through said first flow passage means responsive to fluid pressure communicated to said valve means through said lateral port means; valve seat means within said body means around said longitudinal flow passage means on opposite sides of said lateral port means; a valve member slidably disposed through said valve seat means, said valve member being provided with longitudinally spaced recess means each providing fluid communication through said valve seat means from an upstream portion of said longitudinal flow passage into said lateral port means, only one of said spaced recess means being in communication with said lateral port means at any longitudinal position of said valve member, and said valve member having a central recess independent of said longitudinally spaced recesses for communicating a downstream portion of said longitudinal flow passage with said lateral port means, means on said valve member biasing said member toward a central position, said valve member being movable in a downstream direction responsive to a pressure differential applied across said member within said longitudinal flow passage for communicating an upstream portion of said flow passage with said lateral port means, said valve member being further movable downstream responsive to an increase in said pressure differential for communicating the downstream portion of said flow passage with said lateral port means simultaneously with said communication of said port means with the upstream portion of said flow passage, and said valve rod being still further movable in a downstream direction responsive to a further increase in said pressure differential across said valve member for restricting communication into said lateral port means from said upstream portion of said longitudinal flow passage while effecting maximum fluid communication between said lateral port means and said downstream portion of said flow passage for progressively reducing the fluid pressure communicated to said valve means through said lateral port means.

37. A servo valve as defined in claim 36 including secondary valve means supported around said valve means supported around said valve member on either side of said lateral port means operable supplementary to said valve member and movable in a direction from said valve seat toward the downstream end of said body responsive to pressure differential across said valve member for still further increasing communication between the downstream portion of said longitudinal flow passage and said lateral port means for providing minimum fluid pressure transmitted to said valve means through said lateral port means.

38. Apparatus adapted to be pumped through a flow conductor comprising: mandrel means; annular seal means supported on said mandrel means and expandable into engagement with said flow conductor, an outer surface portion of said mandrel means and an inner surface portion of said seal means defining an annular chamber within said seal means around said mandrel means; flow passage means communicating fluid pressure within said flow conductor at opposite ends of said seal means with said annular chamber; and valve means supported on said mandrel means in said flow passage means for controlling fluid pressure admitted through said flow passage means into said annular chamber and controlling fluid pressure exhausted from said annular chamber through said flow passage means, said valve means being operable in response to fluid pressure to selectively control the admission and exhaust of fluid pressure from both upstream and downstream of said seal means into said annular chamber to vary the pressure within said seal means to control interface pressure engagement of said seal means with said flow conductor.

References Cited

UNITED STATES PATENTS

| | | | |
|---|---|---|---|
| 2,061,993 | 11/1936 | Baker | 277—34.6 |
| 2,334,788 | 11/1943 | O'Leary | 277—34.6 X |
| 2,578,818 | 12/1951 | Martin | 166—224 |
| 2,860,356 | 11/1958 | Matheny | 15—104.06 |
| 3,052,302 | 9/1962 | Lagucki | 166—153 |
| 3,318,605 | 5/1967 | Brown | 166—187 X |
| 3,312,282 | 4/1967 | Yetman | 166—46 |
| 3,346,045 | 10/1967 | Knapp et al. | 166—46 X |
| 3,373,820 | 3/1968 | Robinson et al. | 166—187 |
| 3,419,074 | 12/1968 | Brown | 166—153 X |

JAMES A. LEPPINK, Primary Examiner

I. A. CALVERT, Assistant Examiner

U.S. Cl. X.R.

166—187, 315

Disclaimer and Dedication 3,506,068.—*Norman F. Brown* and *John V. Fredd,* Dallas, Tex. PUMPABLE IMPELLER PISTONS FOR FLOW CONDUCTORS. Patent dated Apr. 14, 1970. Disclaimer and Dedication filed Jan. 6, 1983, by the assignee, *Otis Engineering Corp.*

Hereby disclaims and dedicates to the Public the remaining term of said patent.

[*Official Gazette April 5, 1983.*]